US012579466B2

(12) United States Patent
Gogin et al.

(10) Patent No.: US 12,579,466 B2
(45) Date of Patent: Mar. 17, 2026

(54) DYNAMIC USER-INTERFACE COMPARISON BETWEEN MACHINE LEARNING OUTPUT AND TRAINING DATA

(71) Applicant: GE Precision Healthcare LLC, Wauwatosa, WI (US)

(72) Inventors: Nicolas Gogin, Buc (FR); Jorge Hernandez Londono, Buc (FR); Vincent Morard, Buc (FR)

(73) Assignee: GE Precision Healthcare LLC, Waukesha, WI (US)

( * ) Notice: Subject to any disclaimer, the term of this patent is extended or adjusted under 35 U.S.C. 154(b) by 967 days.

(21) Appl. No.: 17/662,568

(22) Filed: May 9, 2022

(65) Prior Publication Data

US 2023/0359927 A1     Nov. 9, 2023

(51) Int. Cl.
*G06N 20/00*          (2019.01)
*G06F 9/451*          (2018.01)

(52) U.S. Cl.
CPC ............. *G06N 20/00* (2019.01); *G06F 9/451* (2018.02)

(58) Field of Classification Search
CPC ............ G06N 20/00; G06F 9/451; G06F 9/44
USPC ..................................................... 706/11, 12
See application file for complete search history.

(56) References Cited

U.S. PATENT DOCUMENTS

| | | | |
|---|---|---|---|
| 6,950,786 B1* | 9/2005 | Sonneland ............. | G01V 1/301 703/2 |
| 2018/0046935 A1* | 2/2018 | Amershi ............... | G06T 11/001 |

| | | | |
|---|---|---|---|
| 2018/0165809 A1* | 6/2018 | Stanitsas ................... | G06T 5/40 |
| 2019/0122073 A1* | 4/2019 | Ozdemir .................. | G06N 3/09 |
| 2019/0295252 A1* | 9/2019 | Fuchs ................ | G06V 10/7635 |
| 2020/0286614 A1* | 9/2020 | Do ........................... | G06N 7/01 |
| 2020/0320354 A1* | 10/2020 | Ghesu ................ | G06F 18/2155 |
| 2020/0349434 A1* | 11/2020 | Zhang ...................... | G06N 3/09 |
| 2020/0380675 A1* | 12/2020 | Golden ................ | G06T 7/0012 |

(Continued)

FOREIGN PATENT DOCUMENTS

| | | |
|---|---|---|
| CN | 108399354 A | 8/2018 |
| CN | 108847286 A | 11/2018 |

(Continued)

OTHER PUBLICATIONS

Alsal et al., "Visual Methods for Analyzing Probabilistic Classification Data", Transactions on Visualization and Computer Graphics, vol. 20, No. 12, Aug. 11, 2014, pp. 1703-1712 (Year: 2014).*

(Continued)

*Primary Examiner* — Hwei-Min Lu

(74) *Attorney, Agent, or Firm* — Amin, Turocy & Watson, LLP

(57) ABSTRACT

Systems/techniques that facilitate dynamic user-interface comparison between machine learning output and training data are provided. In various embodiments, a system can access a data candidate on which a machine learning classifier is to be executed. In various aspects, the system can generate, via execution of the machine learning classifier, a predicted classification based on the data candidate. In various instances, the system can render, on an electronic display, a confidence graph that visually depicts how well or how poorly the data candidate and the predicted classification fit into an annotated training dataset on which the machine learning classifier has been trained.

20 Claims, 16 Drawing Sheets

(56)                    References Cited

U.S. PATENT DOCUMENTS

| | | | | |
|---|---|---|---|---|
| 2022/0138561 A1* | 5/2022 | Prendki | .................... | G06N 3/08 |
| | | | | 706/12 |
| 2022/0351037 A1* | 11/2022 | Li | ....................... | G01N 21/3563 |
| 2023/0169751 A1* | 6/2023 | Geurts | ................. | G06V 10/774 |
| | | | | 382/159 |

FOREIGN PATENT DOCUMENTS

| | | | |
|---|---|---|---|
| WO | 9904690 | A1 | 2/1999 |
| WO | 2006064470 | A2 | 6/2006 |
| WO | 2015069827 | A2 | 5/2015 |

OTHER PUBLICATIONS

Ren et al., "Squares: Supporting Interactive Performance Analysis for Multiclass Classifiers", IEEE Transactions on Visualization and Computer Graphics, vol. 23, No. 1, Aug. 15, 2016, pp. 61-70 (Year: 2016).*

Chen et al., "OoDAnalyzer: Interactive Analysis of Out-of-Distribution Samples", IEEE Transactions on Visualization and Computer Graphics, vol. 27, No. 7, Feb. 11, 2020, pp. 3335-3349 (Year: 2020).*

Viechtbauer, "Model Checking in Meta-Analysis", Handbook of Meta-Analysis, Edited by Christopher H. Schmid et. al., Chapman and Hall/CRC, Sep. 6, 2020, pp. 219-254. (Year: 2020).*

Jadhav, What is t-SNE, https://medium.com/analytics-vidhya/what-is-t-sne-37bfb920e431, Analytics Vidhya, Jul. 20, 2020, 5pgs.

* cited by examiner

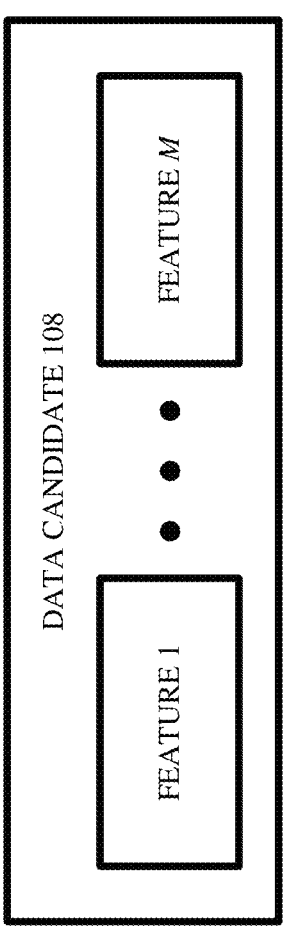
FIG. 2

FIG. 12

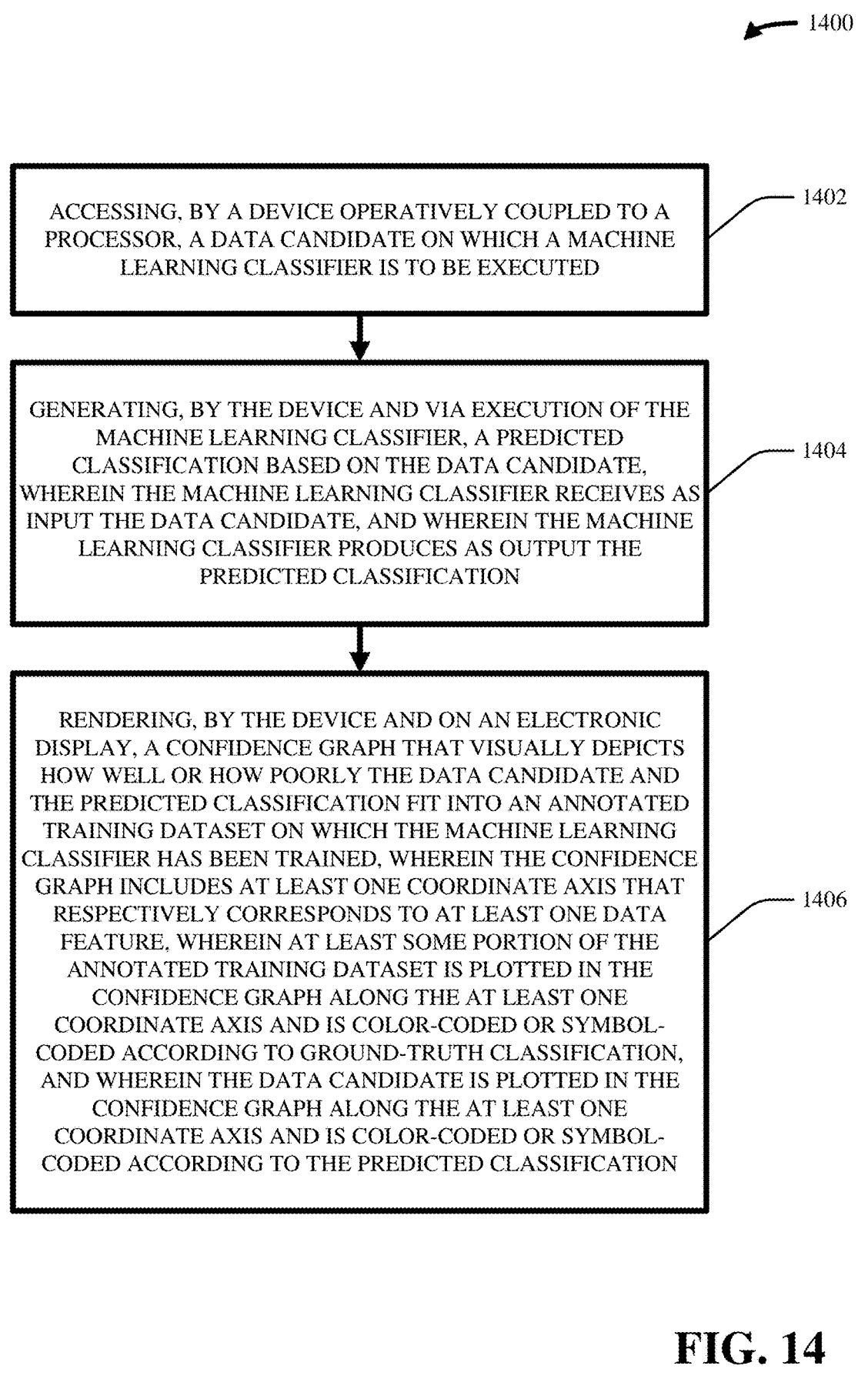

1400

ACCESSING, BY A DEVICE OPERATIVELY COUPLED TO A PROCESSOR, A DATA CANDIDATE ON WHICH A MACHINE LEARNING CLASSIFIER IS TO BE EXECUTED — 1402

GENERATING, BY THE DEVICE AND VIA EXECUTION OF THE MACHINE LEARNING CLASSIFIER, A PREDICTED CLASSIFICATION BASED ON THE DATA CANDIDATE, WHEREIN THE MACHINE LEARNING CLASSIFIER RECEIVES AS INPUT THE DATA CANDIDATE, AND WHEREIN THE MACHINE LEARNING CLASSIFIER PRODUCES AS OUTPUT THE PREDICTED CLASSIFICATION — 1404

RENDERING, BY THE DEVICE AND ON AN ELECTRONIC DISPLAY, A CONFIDENCE GRAPH THAT VISUALLY DEPICTS HOW WELL OR HOW POORLY THE DATA CANDIDATE AND THE PREDICTED CLASSIFICATION FIT INTO AN ANNOTATED TRAINING DATASET ON WHICH THE MACHINE LEARNING CLASSIFIER HAS BEEN TRAINED, WHEREIN THE CONFIDENCE GRAPH INCLUDES AT LEAST ONE COORDINATE AXIS THAT RESPECTIVELY CORRESPONDS TO AT LEAST ONE DATA FEATURE, WHEREIN AT LEAST SOME PORTION OF THE ANNOTATED TRAINING DATASET IS PLOTTED IN THE CONFIDENCE GRAPH ALONG THE AT LEAST ONE COORDINATE AXIS AND IS COLOR-CODED OR SYMBOL-CODED ACCORDING TO GROUND-TRUTH CLASSIFICATION, AND WHEREIN THE DATA CANDIDATE IS PLOTTED IN THE CONFIDENCE GRAPH ALONG THE AT LEAST ONE COORDINATE AXIS AND IS COLOR-CODED OR SYMBOL-CODED ACCORDING TO THE PREDICTED CLASSIFICATION — 1406

FIG. 14

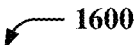
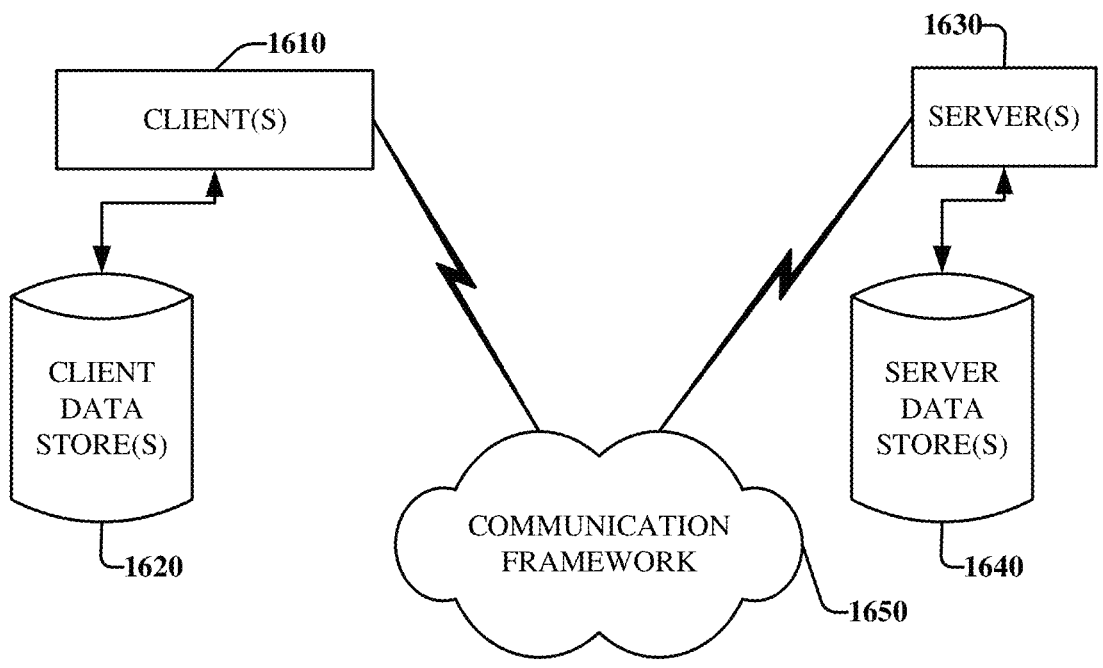
FIG. 16

DYNAMIC USER-INTERFACE COMPARISON BETWEEN MACHINE LEARNING OUTPUT AND TRAINING DATA

TECHNICAL FIELD

The subject disclosure relates generally to machine learning, and more specifically to dynamic user-interface comparison between machine learning output and training data.

BACKGROUND

Machine learning classifiers are implemented in two phases: a training phase, and a deployment/inferencing phase. During the training phase, a machine learning classifier is iteratively trained to accurately perform its desired classification and/or determination. During the deployment/inferencing phase, the machine learning classifier is executed, post-training, on real-world data, so that the desired classification and/or determination is applied to such real-world data. Unfortunately, when a deployment/inferencing phase is implemented via existing techniques, there exists a significant likelihood that the machine learning classifier cannot accurately classify certain real-world data despite having been trained.

Accordingly, systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate dynamic user-interface comparison between machine learning output and training data are described.

According to one or more embodiments, a system is provided. The system can comprise a computer-readable memory that can store computer-executable components. The system can further comprise a processor that can be operably coupled to the computer-readable memory and that can execute the computer-executable components stored in the computer-readable memory. In various embodiments, the computer-executable components can comprise a receiver component. In various cases, the receiver component can access a data candidate on which a machine learning classifier is to be executed. In various aspects, the computer-executable components can further comprise a model component. In various cases, the model component can generate, via execution of the machine learning classifier, a predicted classification based on the data candidate, wherein the machine learning classifier can receive as input the data candidate, and wherein the machine learning classifier can produce as output the predicted classification. In various instances, the computer-executable components can further comprise a visualization component. In various cases, the visualization component can render, on an electronic display, a confidence graph that visually depicts how well or how poorly the data candidate and the predicted classification fit into an annotated training dataset on which the machine learning classifier has been trained, wherein the confidence graph can include at least one coordinate axis that respectively corresponds to at least one data feature, wherein at least some portion of the annotated training dataset can be plotted in the confidence graph along the at least one coordinate axis and can be color-coded or symbol-coded according to ground-truth classification, and wherein the data candidate can be plotted in the confidence graph along the at least one coordinate axis and can be color-coded or symbol-coded according to the predicted classification.

According to one or more embodiments, the above-described system can be implemented as a computer-implemented method and/or a computer program product.

DESCRIPTION OF THE DRAWINGS

FIG. 2 illustrates an example, non-limiting block diagram of a data candidate having one or more data features in accordance with one or more embodiments described herein.

FIG. 12 illustrates an example, non-limiting medical graphical user interface depicting a confidence graph in accordance with one or more embodiments described herein.

FIG. 14 illustrates a flow diagram of an example, non-limiting computer-implemented method that facilitates dynamic user-interface comparison between machine learning output and training data in accordance with one or more embodiments described herein.

FIG. 16 illustrates an example networking environment operable to execute various implementations described herein.

DETAILED DESCRIPTION

Figure 1:
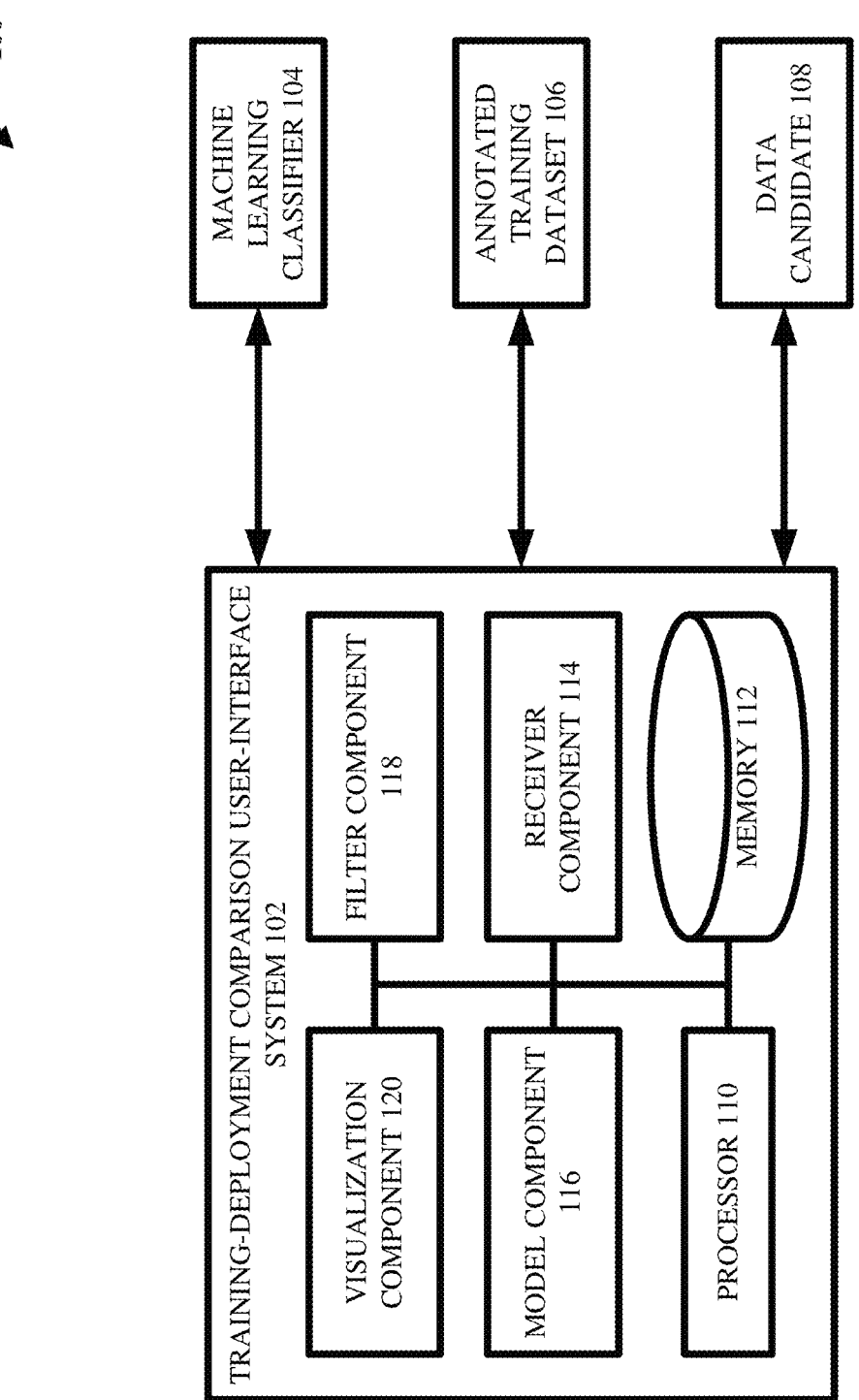
FIG. 1 illustrates a block diagram of an example, non-limiting system that facilitates dynamic user-interface comparison between machine learning output and training data in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Machine learning classifiers (e.g., neural network classifiers, support vector machine classifiers, naïve Bayes classifiers, linear and/or logistic regression classifiers, decision tree classifiers, random forest classifiers) can be implemented in two phases: a training phase, and a deployment/inferencing phase. During the training phase, a machine learning classifier can be iteratively trained (e.g., via back-propagation for neural networks, via sample splitting for decision trees) to accurately perform its desired classification and/or determination. During the deployment/inferencing phase (e.g., which occurs after training), the machine learning classifier can be executed on real-world data, so that the desired classification and/or determination can be applied to such real-world data.

Unfortunately, when a deployment/inferencing phase is implemented via existing techniques, there exists a significant likelihood that the machine learning classifier cannot accurately classify certain real-world data despite having been trained. In particular, the machine learning classifier can be accurately executed only on real-world data that is sufficiently "similar" to the data on which it has been trained. If the machine learning classifier is executed on a given piece of data which is not sufficiently "similar" to the data on which the machine learning classifier has been trained, any results produced by the machine learning classifier based on such given piece of data cannot be considered as reliable. Because existing techniques for deploying/inferencing the machine learning classifier ignore such considerations, a technician and/or operator of the machine learning classifier can be unable to know whether or not the results produced by the machine learning classifier can be trusted.

Accordingly, systems and/or techniques that can address one or more of these technical problems can be desirable.

Various embodiments described herein can address one or more of these technical problems. One or more embodiments described herein include systems, computer-implemented methods, apparatus, and/or computer program products that can facilitate dynamic user-interface comparison between machine learning output and training data. In various aspects, the inventors of various embodiments described herein recognized that existing techniques for deploying/inferencing a machine learning classifier can be vulnerable to unreliability, precisely because such existing techniques do not take into consideration how well a given piece of deployment data (e.g., a given piece of data on which it is desired to execute the machine learning classifier post-training) fits into the feature distributions exhibited by the data on which the machine learning classifier has been trained. Accordingly, the present inventors devised various embodiments described herein, which can be considered as a computerized tool (e.g., any suitable combination of computer-executable hardware and/or computer-executable software) that can visually illustrate and/or visually depict how the features (e.g., characteristics, attributes) of a piece of deployment data compare to those of the dataset on which the machine learning classifier was trained. In other words, such computerized tool can be considered as a graphical user interface that visually renders on an electronic computer display/screen/monitor a visualization, where such visualization indicates and/or shows how well or how poorly that piece of deployment data fits into the feature distributions of the training dataset. Therefore, a technician who is operating and/or overseeing the machine learning classifier can see and/or view such visualization and can thus know whether or not to trust the results produced by the machine learning classifier based on that piece of deployment data.

For example, if the visualization indicates/shows that the features of the piece of deployment data fit nicely into and/or with the feature distributions of the training dataset (e.g., if the visualization shows that the piece of deployment data is not an outlier when compared to the training dataset), the technician can conclude that the results produced by the machine learning classifier based on such piece of deployment data can be considered as trustworthy. On the other hand, if the visualization instead indicates/shows that the features of the piece of deployment data do not fit nicely into and/or with the feature distributions of the training dataset (e.g., if the visualization shows that the piece of deployment data is an outlier when compared to the training dataset), the technician can conclude that the results produced by the machine learning classifier based on such piece of deployment data can be considered as untrustworthy. In this way, the computerized tool can be considered as providing a graphical user interface that can allow the technician to gauge how much trust and/or confidence to assign to the inferencing results outputted by the machine learning classifier.

In various embodiments, the computerized tool described herein can comprise a receiver component, a model component, a filter component, and/or a visualization component. Furthermore, such computerized tool can be electronically integrated with a machine learning classifier, an annotated training dataset, and/or a data candidate.

In various embodiments, the annotated training dataset can include a set of training data candidates and a set of ground-truth classifications that respectively correspond to the set of training data candidates. In various aspects, the set of training data candidates can include any suitable number of training data candidates. In various instances, a training data candidate can be any suitable electronic information that has any suitable format and/or dimensionality as desired (e.g., a training data candidate can be a two-dimensional pixel array and/or three-dimensional voxel array, a training data candidate can be a collection of timeseries data, a training data candidate can be a collection of waveform data). As a non-limiting example, each training data candidate can be a two-dimensional medical image (e.g., a two-dimensional pixel array) that depicts any suitable anatomical structure (e.g., body part, organ, tissue) and/or any suitable portion thereof of any suitable medical patient (e.g., human, animal, and/or otherwise).

In any case, each training data candidate can exhibit and/or otherwise be associated with any suitable number of features (e.g., any suitable number of characteristics, attributes, and/or metadata tags). In various aspects, some features can be based on the format and/or dimensionality of the training data candidates. As an example, if each training data candidate is an image, then a feature can be an average pixel/voxel intensity value, a max pixel/voxel intensity value, a min pixel/voxel intensity value, a size of a depicted structure/object, a shape of a depicted structure/object, and/or a visual noise/blurring level. As another example, if each training data candidate is timeseries data, then a feature can be an average timeseries value, a max timeseries value, a min timeseries value, and/or a trendline slope value. As still another example, if each training data candidate is waveform data, then a feature can be a frequency spectra value, a max amplitude value, a min amplitude value, a wavelength value, and/or a period value.

In various other aspects, some features can be independent of the format and/or dimensionality of the training data candidates. For example, regardless of the format/dimensionality of the training data candidates, a feature of a given training data candidate can be: a time and/or date on which that given training data candidate was measured, recorded, and/or otherwise captured; a geographic location at which that given training data candidate was measured/recorded/captured; a controllable acquisition setting/parameter of a piece of equipment that measured/recorded/captured that given training data candidate (e.g., if the given training data candidate is an image of a liver that was generated by a computed tomography (CT) scanner, then a controllable acquisition setting/parameter can be the voltage level, amperage level, scan speed, and/or reconstruction protocol that was implemented by that CT scanner to generate that given training data candidate); and/or a demographic identifier associated with that given training data candidate (e.g., if the given training data candidate is associated with a particular medical patient, a demographic identifier can be an age of the particular medical patient, a gender of the particular medical patient, an ethnicity of the particular medical patient, an occupation of that particular medical patient, and/or a habit/activity of that particular medical patient).

In various instances, the set of ground-truth classifications can respectively correspond (e.g., in one-to-one fashion) with the set of training data candidates. That is, for each given training data candidate, there can be a ground-truth classification that corresponds to the given training data candidate. In any case, a ground-truth classification can be any suitable electronic information having any suitable format and/or dimensionality (e.g., can be a scalar, a vector, a matrix, a tensor, a character string, and/or any suitable combination thereof) that represents and/or indicates a class to which a respectively corresponding training data candidate belongs. In other words, a ground-truth classification can be considered as an annotation label for a respectively corresponding training data candidate.

In various aspects, any suitable number and/or types of classes can be represented by the set of ground-truth classifications. For instance, suppose that a particular training data candidate is a two-dimensional medical image depicting a particular anatomical structure of a particular medical patient. In such case, a ground-truth classification that corresponds to that particular training data candidate can indicate whether or not that particular training data candidate is known and/or deemed to depict a medical pathology/injury and/or symptoms of such medical pathology/injury. As a non-limiting example, if each of the set of training data candidates is a medical image (e.g., a CT scanned image) of a brain, then each of the set of ground-truth classifications can indicate whether a respectively corresponding training data candidate depicts a tumor-afflicted brain or a non-tumor-afflicted brain (e.g., in such case, there can be a tumor class and a non-tumor class). As another non-limiting example, if each of the set of training data candidates is a medical image (e.g., a CT scanned image) of a liver, then each of the set of ground-truth classifications can indicate whether a respectively corresponding training data candidate depicts a severely inflamed liver, a moderately inflamed liver, or a non-inflamed liver (e.g., in such case, there can be a severely-inflamed class, a moderately-inflamed class, and a non-inflamed class).

In various embodiments, the machine learning classifier can exhibit any suitable artificial intelligence architecture as desired. For example, in some cases, the machine learning classifier can exhibit a deep learning neural network architecture. In such case, the machine learning classifier can include any suitable number of layers (e.g., input layer, one or more hidden layers, output layer), any suitable numbers of neurons in various layers (e.g., different layers can have the same and/or different numbers of neurons as each other), any suitable activation functions (e.g., sigmoid, softmax, hyperbolic tangent, rectified linear unit) in various neurons (e.g., different neurons can have the same and/or different activation functions as each other), and/or any suitable interneuron connections (e.g., forward connections, skip connections, recurrent connections) and/or interneuron connection patterns (e.g., fully connected, not fully connected). In other cases, the machine learning classifier can exhibit any other suitable artificial intelligence architecture as desired (e.g., support vector machine, naïve Bayes, linear and/or logistic regression, decision tree, random forest).

In any case, the internal parameters (e.g., weights, biases) of the machine learning classifier can have been randomly initialized, and the machine learning classifier can have been trained (e.g., in supervised fashion) on the annotated training dataset. For example, for any given training data candidate in the annotated training dataset, there can be a given ground-truth classification that corresponds to the given training data candidate. In various cases, the machine learning classifier can have been executed on the given training data candidate, thereby yielding some output. For instance, if the machine learning classifier exhibits a neural network architecture, then the given training data candidate can have been received by an input layer of the machine learning classifier, the given training data candidate can have completed a forward pass through one or more hidden layers of the machine learning classifier, and an output layer of the machine learning classifier can have computed the output based on activations provided by the one or more hidden layers. In various cases, the output can be considered as representing the class to which the machine learning classifier believes/infers the given training data candidate should belong, whereas the given ground-truth classification can be considered as an annotation that definitively indicates the correct/accurate class to which the given training data candidate is known/deemed to belong. Note that, if the machine learning classifier has so far undergone no and/or little training, then the output can be highly inaccurate (e.g., the output can be very different from the given ground-truth classification) In any case, an error/loss can have been computed between the output and the given ground-truth classification, and the internal parameters of the machine learning classifier can have been updated via backpropagation, where such backpropagation can have been driven by the computed error/loss. Such training procedure can have been repeated for each of the set of training data candidates, thereby causing the internal parameters of the machine learning classifier to become iteratively optimized for accurately classifying data candidates. As those having ordinary skill in the art will appreciate, any suitable training batch sizes and/or any suitable training termination criteria can have been implemented.

In various embodiments, the data candidate can be any suitable electronic information that has the same format and/or dimensionality as any one of the set of training data candidates (e.g., if each training data candidate is a two-dimensional array of pixels, then the data candidate can likewise be a two-dimensional array of pixels; if each training data candidate is a three-dimensional array of voxels, then the data candidate can likewise be a three-dimensional array of voxels; if each training data candidate is timeseries data having a particular cardinality, then the data candidate can likewise be timeseries data having the particular cardinality; if each training data candidate is waveform data, then the data candidate can likewise be waveform data). Accordingly, just like each of the set of training data candidates, the data candidate can exhibit and/or otherwise be associated with any suitable number of features. In various aspects, unlike each of the set of training data candidates, the data candidate can lack and/or otherwise not be associated with a ground-truth classification.

In any case, a technician that is operating and/or overseeing the machine learning classifier can desire to know/gauge how much confidence and/or trust he/she can place in the machine learning classifier to accurately/correctly classify the data candidate. In various instances, the computerized tool described herein can help the technician to know/gauge how much confidence and/or trust to place in the machine learning classifier.

In various embodiments, the receiver component of the computerized tool can electronically receive and/or otherwise electronically access the machine learning classifier, the annotated training dataset, and/or the data candidate. In some aspects, the receiver component can electronically retrieve the machine learning classifier, the annotated training dataset, and/or the data candidate from any suitable centralized and/or decentralized data structure (e.g., graph data structure, relational data structure, hybrid data structure), whether remote from and/or local to the receiver component. In any case, the receiver component can electronically obtain and/or access the machine learning classifier, the annotated training dataset, and/or the data candidate, such that other components of the computerized tool can electronically interact with (e.g., read, write, edit, copy, manipulate) the machine learning classifier, the annotated training dataset, and/or the data candidate.

In various embodiments, the model component of the computerized tool can electronically execute the machine learning classifier on the data candidate, thereby yielding a predicted classification, wherein the predicted classification can be any suitable electronic data having any suitable format and/or dimensionality (e.g., can be one or more scalars, vectors, matrices, tensors, and/or character string) that indicates and/or otherwise conveys the class to which the machine learning classifier infers/believes the data candidate belongs. For example, suppose that the machine learning classifier exhibits a neural network architecture. In such case, the model component can feed the data candidate to an input layer of the machine learning classifier, the data candidate can complete a forward pass through one or more hidden layers of the machine learning classifier, and/or an output layer of the machine learning classifier can calculate the predicted classification based on activation maps generated by the one or more hidden layers. In any case, the model component can generate the predicted classification by executing the machine learning classifier on the data candidate.

In various instances, the predicted classification may and/or may not be correct/accurate, despite the fact that the machine learning classifier can have already undergone training. Furthermore, because the data candidate can lack a corresponding ground-truth classification, the technician that is operating/overseeing the machine learning classifier can fail to know/gauge how much confidence he/she can have that the predicted classification is correct/accurate. The computerized tool can address this problem, as described herein.

In various embodiments, the filter component of the computerized tool can electronically select and/or choose any suitable subset of the annotated training dataset. In various aspects, such selected/chosen subset can be referred to as an annotated training subset. In various instances, the annotated training subset can include any suitable number of training data candidates from the annotated training dataset and can also include the ground-truth classifications that respectively correspond to those training data candidates. In various aspects, the filter component can select and/or choose the annotated training subset by applying any suitable feature filters to the annotated training dataset.

In some cases, those feature filters can be based on user-provided input. In other words, the technician that is operating/overseeing the machine learning classifier can specify (e.g., via any suitable human-to-computer interface device, such as a keyboard, a keypad, a touchscreen, and/or a microphone) one or more ranges of feature values that are to be retained in and/or filtered out of the annotated training dataset, where the result of such retainment and/or filtration can be the annotated training subset. As a non-limiting example, the technician can specify that only those training data candidates in the annotated training dataset that were measured/recorded/captured during the summer of 2021 are to be included in the annotated training subset. Conversely, the technician can instead specify that only those training data candidates in the annotated training dataset that were measured/recorded/captured before or after, but not during, the summer of 2021 are to be included in the annotated training subset. As another non-limiting example, the technician can specify that only those training data candidates in the annotated training dataset that were measured/recorded/captured in the state of Ohio are to be included in the annotated training subset. Conversely, the technician can instead specify that only those training data candidates in the annotated training dataset that were measured/recorded/captured outside the state of Ohio are to be included in the annotated training subset. As yet another non-limiting example, the technician can specify that only those training data candidates in the annotated training dataset that correspond to medical patients between the ages of 18 years and 30 years are to be included in the annotated training subset.

Conversely, the technician can instead specify that only those training data candidates in the annotated training dataset that correspond to medical patients younger than 18 years or older than 30 years are to be included in the annotated training subset. As still another non-limiting example, if each training data candidate is a medical image of a liver, then the technician can specify that only those training data candidates in the annotated training dataset that depict livers having elongations of at least 5 centimeters are to be included in the annotated training subset. Conversely, the technician can instead specify that only those training data candidates in the annotated training dataset that depict livers having elongations of less than 5 centimeters are to be included in the annotated training subset. As even another non-limiting example, if each training data candidate is a medical image generated by a CT scanner, then the technician can specify that only those training data candidates in the annotated training dataset that were measured/recorded/captured at a CT voltage level of at least 15 kilovolts (kV) are to be included in the annotated training subset. Conversely, the technician can instead specify that only those training data candidates in the annotated training dataset that were measured/recorded/captured at a CT voltage level less than 15 kV are to be included in the annotated training subset. In this way, the technician can manually specify any suitable feature filters as desired.

In other cases, the feature filters can be automatically determined based on the data candidate. That is, the feature filters can be automatically selected/chosen to match and/or to be within any suitable threshold margins of one or more features of the data candidate. As a non-limiting example, the feature filters can be automatically adjusted so that only those training data candidates in the annotated training dataset that were measured/recorded/captured within one month before or one month after the time/date on which the data candidate was measured/recorded/captured are to be included in the annotated training subset. As another non-limiting example, the feature filters can be automatically adjusted so that only those training data candidates in the annotated training dataset that were measured/recorded/captured within the same city where the data candidate was measured/recorded/captured are to be included in the annotated training subset. As yet another non-limiting example, the feature filters can be automatically adjusted so that only those training data candidates in the annotated training dataset that correspond to medical patients of the same gender as a medical patient to which the data candidate corresponds are to be included in the annotated training subset. As still another non-limiting example, if each training data candidate is a medical image of a brain, then the feature filters can be automatically adjusted so that only those training data candidates in the annotated training dataset that depict brains having lengths and/or widths within 2 centimeters of those of a brain depicted in the data candidate are to be included in the annotated training subset. As even another non-limiting example, if each training data candidate is a medical image generated by a CT scanner, then the feature filters can be automatically adjusted so that only those training data candidates in the annotated training dataset that were measured/recorded/captured at a CT voltage level that matches that with which the data candidate was measured/recorded/captured are to be included in the annotated training subset. In this way, any suitable feature filters as desired can be automatically established based on the features of the data candidate.

In some cases, the annotated training subset can be equivalent to the annotated training dataset (e.g., in such cases, all of the training data candidates can be retained and/or none of the training data candidates can be filtered out).

In various embodiments, the visualization component of the computerized tool can electronically render (e.g., on any suitable computer screen, display, and/or monitor) a confidence graph, based on the data candidate, the predicted classification, and/or the annotated training subset. In various aspects, the confidence graph can include at least one coordinate axis that respectively corresponds to at least one feature. Furthermore, the training data candidates of the annotated training subset can be plotted along the at least one coordinate axis and can be color-coded and/or symbol-coded according to their ground-truth classifications (e.g., each distinct class of training data candidate can be plotted in a respectively corresponding color and/or can be plotted using a respectively corresponding point-symbol shape). Further still, the data candidate itself can also be plotted along the at least one coordinate axis and can be color-coded and/or symbol-coded according to the predicted classification. Thus, in various aspects, the confidence graph can be considered as a visual illustration that shows how well and/or how poorly the data candidate and the predicted classification fit into and/or with the annotated training subset (e.g., that shows whether or not the data candidate and the predicted classification constitute an outlier when compared to the annotated training subset).

More specifically, the confidence graph can, in various aspects, be a one-dimensional histogram and/or a two-dimensional scatterplot. First, consider the case of a one-dimensional histogram. In such case, the confidence graph can be considered as having an abscissa and an ordinate, where the abscissa can represent the range of possible values of one particular feature, and where the ordinate can represent frequency and/or probability density for such one particular feature. As a non-limiting example, suppose that each training data candidate is a medical image (e.g., a CT scanned image) depicting a liver of a corresponding medical patient. In such case, the one particular feature can, for instance, be liver elongation. In other words, the abscissa of the confidence graph can be a coordinate axis that represents and/or spans a range of possible liver elongation values, and the ordinate (e.g., orthogonal to the abscissa) of the confidence graph can be a coordinate axis that represents frequency and/or probability density across the possible liver elongation values. Note that each specific training data candidate in the annotated training subset can have a specific liver elongation value and a specific ground-truth classification. Accordingly, the training data candidates in the annotated training subset can be assigned into bins (e.g., histogram bins, bar graph bins) along the abscissa according to their specific liver elongation values, and such bins can be color-coded according to ground-truth classification. The result can be that the confidence graph visually depicts one distinct frequency/probability density distribution per distinct class of training data candidates.

For instance, suppose that there are three possible classes for training data candidates that depict livers of medical patients: a severely-inflamed class, a moderately-inflamed class, and a non-inflamed class. In such case, the confidence graph can be a one-dimensional histogram that simultaneously (e.g., in overlapping fashion) illustrates: a first frequency/probability density distribution in a first color, where such first frequency/probability density distribution is tabulated based only on those training data candidates in the annotated training subset that have severely-inflamed ground-truth classifications; a second frequency/probability density distribution in a second color, where such second frequency/probability density distribution is tabulated based only on those training data candidates in the annotated training subset that have moderately-inflamed ground-truth classifications; and a third frequency/probability density distribution in a third color, where such third frequency/probability density distribution is tabulated based only on those training data candidates in the annotated training subset that have non-inflamed ground-truth classifications.

Furthermore, the data candidate itself can be plotted along the abscissa according to its specific liver elongation value, where the color and/or shape of the symbol that is used to represent the data candidate in the confidence graph can correspond to the predicted classification. In this way, the confidence graph can be considered as visually showing whether or not the data candidate is an outlier when compared to the annotated training subset. For instance, suppose that the predicted classification indicates that the data candidate depicts a severely-inflamed liver. Now, if the majority of training data candidates with the same and/or similar liver elongation value as the data candidate have severely-inflamed ground-truth classifications (e.g., if the confidence graph shows that the first frequency/probability density distribution is taller at the location where the data candidate is plotted than the second and third frequency/probability density distributions), then it can be inferred that the predicted classification, which indicates severely-inflamed in this example, is likely correct and/or accurate. On the other hand, if the majority of training data candidates with the same and/or similar liver elongation value as the data candidate have non-inflamed ground-truth classifications (e.g., if the confidence graph shows that the third frequency/probability density distribution is taller at the location where the data candidate is plotted than the first and second frequency/probability density distributions), then it can be inferred that the predicted classification, which indicates severely-inflamed in this example, is likely incorrect and/or inaccurate. In any case, the confidence graph can visually show how well or how poorly the data candidate and the predicted classification fit into the annotated training subset, such that the technician can gain a sense of how much confidence/trust to place with the predicted classification by visually viewing the confidence graph.

Next, consider the case of a two-dimensional scatterplot. In such case, the confidence graph can be considered as having an abscissa and an ordinate, where the abscissa can represent the range of possible values of a first particular feature, and where the ordinate can represent the range of possible values of a second particular feature. As a non-limiting example, suppose that each training data candidate is a medical image (e.g., a CT scanned image) depicting a liver of a corresponding medical patient. In such case, the first particular feature can, for instance, be liver elongation, and the second particular feature can, for instance, be liver roundness. In other words, the abscissa of the confidence graph can be a coordinate axis that represents and/or spans a range of possible liver elongation values, and the ordinate (e.g., orthogonal to the abscissa) of the confidence graph can be a coordinate axis that represents and/or spans a range of possible liver roundness values. Note that each specific training data candidate in the annotated training subset can have a specific liver elongation value, a specific liver roundness value, and a specific ground-truth classification. Accordingly, the training data candidates in the annotated training subset can be plotted as points along the abscissa according to their specific liver elongation values and along the ordinate according to their specific liver roundness values, and such points can be color-coded and/or symbol-coded according to ground-truth classification. The result can be that the confidence graph visually depicts one distinct grouping of scatter points per distinct class.

For instance, just as above, suppose that there are three possible classes for training data candidates that depict livers of medical patients: a severely-inflamed class, a moderately-inflamed class, and a non-inflamed class. In such case, the confidence graph can be a two-dimensional scatterplot that simultaneously (e.g., in overlapping fashion) illustrates: a first grouping of scatter points in a first color (or with a first point-symbol, such as a circle), where such first grouping of scatter points is tabulated based only on those training data candidates in the annotated training subset that have severely-inflamed ground-truth classifications; a second grouping of scatter points in a second color (or with a second point-symbol, such as a triangle), where such second grouping of scatter points is tabulated based only on those training data candidates in the annotated training subset that have moderately-inflamed ground-truth classifications; and a third grouping of scatter points in a third color (or with a third point-symbol, such as a square), where such third grouping of scatter points is tabulated based only on those training data candidates in the annotated training subset that have non-inflamed ground-truth classifications.

Furthermore, the data candidate itself can be plotted along the abscissa according to its specific liver elongation value and along the ordinate according to its specific liver roundness value, where the color and/or shape of the symbol that is used to represent the data candidate in the confidence graph can correspond to the predicted classification. In this way, and just as above, the confidence graph can be considered as visually showing whether or not the data candidate and/or the predicted classification constitute an outlier when compared to the annotated training subset. For instance, suppose that the predicted classification indicates that the data candidate depicts a severely-inflamed liver. Now, if the majority of training data candidates with the same/similar liver elongation value and/or with the same/similar liver roundness value as the data candidate have severely-inflamed ground-truth classifications (e.g., if the confidence graph shows that the first grouping of scatter points is thicker than the second and third groupings at/around the location where the data candidate is plotted), then it can be inferred that the predicted classification, which indicates severely-inflamed in this example, is likely correct and/or accurate. On the other hand, if the majority of training data candidates with the same/similar liver elongation value and/or with the same/similar liver roundness value as the data candidate have non-inflamed ground-truth classifications (e.g., if the confidence graph shows that the third grouping of scatter points is thicker than the first and second groupings at/around the location where the data candidate is plotted), then it can be inferred that the predicted classification, which indicates severely-inflamed in this example, is likely incorrect and/or inaccurate. In any case, the confidence graph can visually show how well or how poorly the data candidate and the predicted classification fit into the annotated training subset, such that the technician can gain a sense of how much confidence/trust to place with the predicted classification by visually viewing the confidence graph.

In some embodiments, the confidence graph can be a three-dimensional scatterplot (e.g., just as the two-dimensional scatterplot described above, except with the inclusion of a third orthogonal axis that represents/spans a range of possible values of a third feature).

In various embodiments, the confidence graph can include aspects of both a histogram and a scatterplot. More specifically, the confidence graph can include a scatterplot and can further include a separate color-coded histogram for each axis (e.g., for each feature) of the scatterplot. For example, if the confidence graph includes a two-dimensional scatterplot with the abscissa representing the range of possible liver elongation values and with the ordinate representing the range of possible liver roundness values, then the confidence graph can further include a first one-dimensional histogram and a second one-dimensional histogram, where the first one-dimensional histogram can show color-coded frequency/probability density distributions of liver elongation values, and where the second one-dimensional histogram can show color-coded frequency/probability density distributions of liver roundness values. Such a configuration of the confidence graph can help to provide further information and/or context to the technician operating/overseeing the machine learning classifier.

In any case, the confidence graph can visually show how well and/or how poorly the data candidate and the predicted classification fit into the annotated training subset. Accordingly, even though there is no ground-truth classification for the data candidate, the technician can nevertheless still get a feeling and/or a sense for how much confidence/trust he/she can have in the predicted classification by visually inspecting and/or looking at the confidence graph.

In various aspects, the technician can manually change, in any suitable fashion as desired, the feature filters used to select/choose the annotated training subset. Upon any such change, the filter component and/or the visualization component can repeat any of the above-described functionalities, so as to update the confidence graph. In this way, the confidence graph can be considered as being dynamically updatable.

Accordingly, various embodiments described herein can include a computerized tool that can facilitate dynamic user-interface comparison between machine learning output (e.g., the predicted classification) and training data (e.g., the annotated training subset). Such a computerized tool can visually render, on any suitable computer screen, a confidence graph that can show how much of an outlier a result produced by a machine learning classifier is as compared to the data on which the machine learning classifier was trained. Accordingly, a user that is operating/overseeing the machine learning classifier can visually inspect the confidence graph to get a feeling for how much confidence and/or trust can be placed in the result produced by the machine learning classifier, even though a ground-truth annotation for such result can be unavailable.

Various embodiments described herein can be employed to use hardware and/or software to solve problems that are highly technical in nature (e.g., to facilitate dynamic user-interface comparison between machine learning output and training data), that are not abstract and that cannot be performed as a set of mental acts by a human. Further, some of the processes performed can be performed by a specialized computer (e.g., machine learning classifier, such as a neural network, a support vector machine, a decision tree model) for carrying out defined tasks related to dynamic user-interface comparison between machine learning output and training data. For example, such defined tasks can include: accessing, by a device operatively coupled to a processor, a data candidate on which a machine learning classifier is to be executed; accessing, by the device, an annotated training dataset on which the machine learning classifier has been trained; generating, by the device and via execution of the machine learning classifier, a predicted classification based on the data candidate, wherein the machine learning classifier receives as input the data candidate, and wherein the machine learning classifier produces as output the predicted classification; and rendering, by the device and on an electronic display, a confidence graph that visually depicts how well or how poorly the data candidate and the predicted classification fit into the annotated training dataset, wherein the confidence graph includes at least one coordinate axis that respectively corresponds to at least one data feature, wherein at least some portion of the annotated training dataset is plotted in the confidence graph along the at least one coordinate axis and is color-coded or symbol-coded according to ground-truth classification, and wherein the data candidate is plotted in the confidence graph along the at least one coordinate axis and is color-coded or symbol-coded according to the predicted classification.

Such defined tasks are not performed manually by humans. Indeed, neither the human mind nor a human with pen and paper can electronically access a data candidate and/or data on which a machine learning classifier has been trained, can electronically execute the machine learning classifier on the data candidate to generate a predicted classification label, and can electronically plot, on a computer screen, both the data candidate and the data on which the machine learning classifier was trained in a graph, where the data on which the machine learning classifier was trained is color-coded or symbol-coded according to ground-truth annotation label, and where the data candidate is color-coded or symbol-coded according to the predicted classification label. Instead, various embodiments described herein are inherently and inextricably tied to computer technology and cannot be implemented outside of a computing environment (e.g., a machine learning classifier, such as a decision tree model and/or a neural network, is an inherently-computerized construct that simply cannot be implemented in any way by the human mind without computers; accordingly, a computerized tool that executes a machine learning classifier and that visually renders on a graphical user interface a graph that shows how well data outputted by the machine learning classifier fits with data on which the machine learning classifier was trained is likewise inherently-computerized and cannot be implemented in any sensible, practical, or reasonable way without computers).

Moreover, various embodiments described herein can integrate into a practical application various teachings relating to dynamic user-interface comparison between machine learning output and training data. As explained above, when a deployment/inferencing phase is implemented via existing techniques, there exists a significant likelihood that the machine learning classifier cannot accurately classify certain real-world data despite having been trained. As recognized by the present inventors, this inaccuracy can be due to the real-world data not being sufficiently "similar" to (e.g., due to the real-world data being an outlier with respect to) the data on which the machine learning classifier was trained. Existing techniques for deploying/inferencing the machine learning classifier simply ignore such considerations, and so a technician and/or operator of the machine learning classifier can be unable to know whether or not the results produced by the machine learning classifier can be trusted.

Accordingly, the present inventors devised various systems and/or techniques described herein, which can be considered as a computerized tool that can facilitate dynamic user-interface comparison between machine learning output and training data. More specifically, for any given data candidate, the computerized tool can execute a machine learning classifier on the data candidate, thereby yielding a predicted classification. Moreover, the computerized tool can visually render, on any suitable computer screen/monitor, a confidence graph whose axes correspond to respective data features/characteristics/attributes, where the data on which the machine learning classifier was trained can be plotted in the confidence graph and color-coded/symbol-coded according to ground-truth classification, and where the data candidate itself can also be plotted in the confidence graph and color-coded/symbol-coded according to the predicted classification. Thus, the confidence graph can be considered as visually illustrating how well or how poorly the data candidate and the predicted classification fit with the data on which the machine learning classifier was trained. Therefore, a technician who is operating and/or overseeing the machine learning classifier can look at the confidence graph and can thus know whether or not to trust the predicted classification (e.g., if the confidence graph shows that the data candidate and the predicted classification are outliers as compared to the training data, then the technician can know to have little confidence/trust in the predicted classification; in contrast, if the confidence graph instead shows that the data candidate and the predicted classification are not outliers as compared to the training data, then the technician can know to have more confidence/trust in the predicted classification). Such a computerized tool certainly constitutes a concrete and tangible technical improvement in the field of machine learning classifiers. Therefore, various embodiments described herein clearly qualify as useful and practical applications of computers.

Furthermore, various embodiments described herein can control real-world tangible devices based on the disclosed teachings. For example, various embodiments described herein can electronically execute real-world machine learning classifiers (e.g., decision trees, neural networks) and/or can electronically render real-world images on real-world computer screens based on such execution of real-world machine learning classifiers.

It should be appreciated that the herein figures and description provide non-limiting examples of various embodiments and are not necessarily drawn to scale.

FIG. 1 illustrates a block diagram of an example, non-limiting system 100 that can facilitate dynamic user-interface comparison between machine learning output and training data in accordance with one or more embodiments described herein. As shown, a training-deployment comparison user-interface system 102 can be electronically integrated, via any suitable wired and/or wireless electronic connections, with a machine learning classifier 104, with an annotated training dataset 106, and/or with a data candidate 108.

In various aspects, the data candidate 108 can be any suitable piece of electronic information having any suitable format and/or dimensionality. In various instances, the annotated training dataset 106 can include any suitable number of training data candidates, each having the same format and/or dimensionality as the data candidate 108, and each being annotated with a corresponding ground-truth classification. In various cases, the machine learning classifier 104 can be (and/or can have been) trained on the annotated training dataset 106, and it can be desired to execute the machine learning classifier 104 on the data candidate 108. These details are further described with respect to FIGS. 2-3.

FIG. 2 illustrates an example, non-limiting block diagram 200 of a data candidate having one or more data features in accordance with one or more embodiments described herein.

In other words, FIG. 2 depicts a non-limiting, example embodiment of the data candidate 108.

As mentioned above, the data candidate 108 can be any suitable piece of electronic information having any suitable format and/or dimensionality as desired. That is, the data candidate 108 can be and/or include one or more scalars, one or more vectors, one or more matrices, one or more tensors, one or more character strings, and/or any suitable combination thereof. As a non-limiting example, the data candidate 108 can be an a-by-b pixel array, for any suitable positive integers a and b. As another non-limiting example, the data candidate 108 can be an a-by-b-by-c voxel array for any suitable positive integers a, b, and c. As still another non-limiting example, the data candidate 108 can be a vector and/or matrix of timeseries data points. As yet another non-limiting example, the data candidate 108 can be a vector and/or matrix of waveform data points.

In some cases, the data candidate 108 can be a medical image (e.g., a CT scanned image, a magnetic resonance imaging (MRI) scanned image, a positron emission tomography (PET) scanned image, an X-ray scanned image, an ultrasound scanned image) that depicts any suitable anatomical structure of any suitable medical patient.

In any case, the data candidate 108 can have, can exhibit, and/or can otherwise be associated with m features, for any suitable positive integer m: a feature 1 to a feature m. In various aspects, a feature can be any suitable characteristic and/or attribute of the data candidate 108. In some instances, such characteristics and/or attributes can depend upon the format and/or dimensionality of the data candidate 108. In other instances, however, such characteristics and/or attributes can be independent of the format and/or dimensionality of the data candidate 108. As some non-limiting examples of the former, a feature of the data candidate 108 can be: an average pixel intensity value, a median pixel intensity value, a maximum pixel intensity value, a minimum pixel intensity value, a shape metric of a structure/object depicted by pixels, a size metric of a structure/object depicted by pixels, and/or a level of visual noise/blurring exhibited by pixels, when the data candidate 108 is a pixel array; an average voxel intensity value, a median voxel intensity value, a maximum voxel intensity value, a minimum voxel intensity value, a shape metric of a structure/object depicted by voxels, a size metric of a structure/object depicted by voxels, and/or a level of visual noise/blurring exhibited by voxels, when the data candidate 108 is a voxel array; an average timeseries value, a median timeseries value, a maximum timeseries value, a minimum timeseries value, and/or a slope of a trendline fitted to timeseries values, when the data candidate 108 is a collection of timeseries values; and/or a frequency spectra value, a maximum amplitude value, a minimum amplitude value, a wavelength value, and/or an oscillatory period value, when the data candidate 108 is waveform data. As some non-limiting examples of the latter, a feature of the data candidate 108 can be: a time and/or date (e.g., specified at any suitable level of granularity, such as year, month, week, day, hour, minute, second) on which the data candidate 108 was measured, recorded, captured, and/or otherwise generated; a geographic location (e.g., specified at any suitable level of granularity, such as continent, country, state, city, address, latitude, longitude, elevation) at which the data candidate 108 was measured, recorded, captured, and/or otherwise generated; a controllable acquisition parameter (e.g., voltage level, amperage level, scan speed, reconstruction technique) of a piece of equipment (e.g., a CT scanner, an MRI scanner, a PET scanner, an X-ray scanner, an ultrasound scanner) that measured, recorded, captured, and/or otherwise generated the data candidate 108; and/or a demographic identifier (e.g., age, gender, sex, ethnicity, occupation, habit) associated with the data candidate 108 (e.g., associated with a medical patient whose medical information is represented by the data candidate 108).

More generally, a feature can be one or more scalars, one or more vectors, one or more matrices, one or more tensors, and/or one or more character strings that are associated with the data candidate 108.

In any case, the data candidate 108 can have and/or exhibit m features, which can be considered as being specific values that correspond to m feature variables: that is, the feature 1 can be considered as a specific value of a first feature variable, and the feature m can be considered as a specific value of an m-th feature variable. As a non-limiting example, suppose that the data candidate 108 is a medical image of a brain of a medical patient. Furthermore, suppose that m=5 in such non-limiting example, where a first feature variable can be time/date of capture, where a second feature variable can be geolocation of capture, where a third feature variable can be acquisition voltage level, where a fourth feature variable can be patient age, and where a fifth feature variable can be brain size. In such case, the data candidate 108 can have: the feature 1 which can represent, indicate, and/or convey the specific time/date on which the data candidate 108 was captured; a feature 2 (not shown) which can represent, indicate, and/or convey the specific geolocation at which the data candidate 108 was captured; a feature 3 (not shown) which can represent, indicate, and/or convey the specific voltage level that was used to capture the data candidate 108; a feature 4 (not shown) which can represent, indicate, and/or convey the specific age of the medical patient whose brain is depicted by the data candidate 108; and/or a feature 5 (not shown) which can represent, indicate, and/or convey the specific size of the brain depicted in the data candidate 108.

Figure 3:
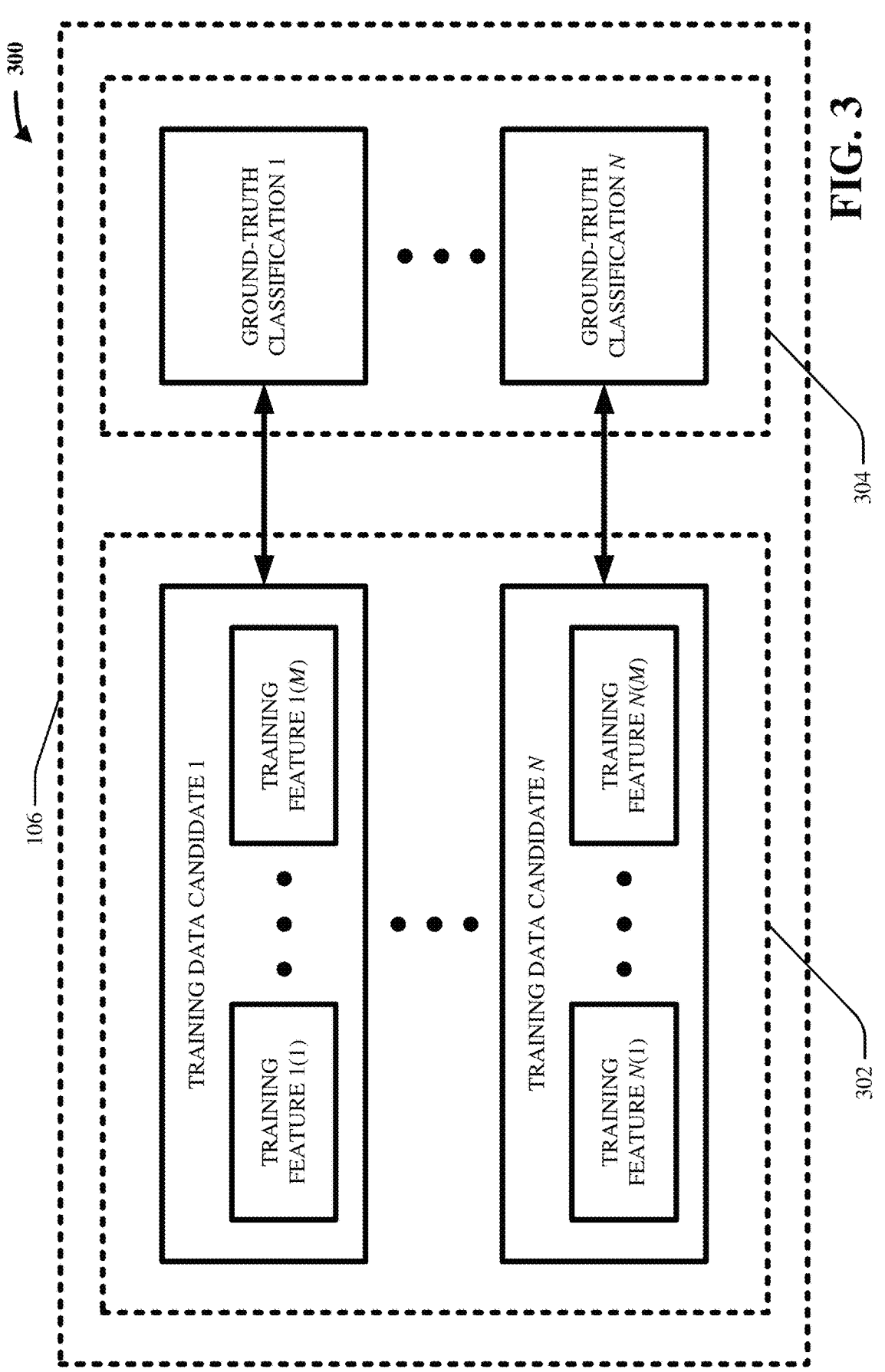
FIG. 3 illustrates an example, non-limiting block diagram of an annotated training dataset in accordance with one or more embodiments described herein.

FIG. 3 illustrates an example, non-limiting block diagram 300 of an annotated training dataset in accordance with one or more embodiments described herein. In other words, FIG. 3 shows a non-limiting, example embodiment of the annotated training dataset 106.

In various embodiments, as shown, the annotated training dataset 106 can include a set of training data candidates 302 and/or a set of ground-truth classifications 304. In various aspects, the set of training data candidates 302 can include n training data candidates for any suitable positive integer n: a training data candidate 1 to a training data candidate n. In various instances, each of the set of training data candidates 302 can have the same format and/or dimensionality as the data candidate 108. As a non-limiting example, if the data candidate 108 is an a-by-b pixel array, then each of the set of training data candidates 302 can also be an a-by-b pixel array. As another non-limiting example, if the data candidate 108 is an a-by-b-by-c voxel array, then each of the set of training data candidates 302 can also be an a-by-b-by-c voxel array. As still another example, if the data candidate 108 is a vector (or matrix) of timeseries data points, then each of the set of training data candidates 302 can also be a vector (or matrix) of timeseries data points. As yet another non-limiting example, if the data candidate 108 is a vector (or matrix) of waveform data, then each of the set of training data candidates 302 can also be a vector (or matrix) of waveform data.

Furthermore, in various aspects, each of the set of training data candidates 302 can have the same number and/or types of features and/or feature variables as the data candidate

108. Accordingly, since the data candidate 108 can have m features that respectively correspond to m feature variables, then each of the set of training data candidates 302 can likewise have m features that respectively correspond to those same m feature variables. For example, the training data candidate 1 can have a training feature 1(1) which can be a specific value of the first feature variable and can have a training feature 1(m) which can be a specific value of the m-th feature variable. Similarly, the training data candidate n can have a training feature n(1) which can be a specific value of the first feature variable and can have a training feature n(m) which can be a specific value of the m-th feature variable. To continue the above non-limiting example, suppose again that the data candidate 108 is a medical image of a brain of a medical patient and that m=5, where a first feature variable can be time/date of capture, where a second feature variable can be geolocation of capture, where a third feature variable can be acquisition voltage level, where a fourth feature variable can be patient age, and where a fifth feature variable can be brain size. In such case, the training data candidate 1 can have: the training feature 1(1) which can represent, indicate, and/or convey the specific time/date on which the training data candidate 1 was captured; a training feature 1(2) (not shown) which can represent, indicate, and/or convey the specific geolocation at which the training data candidate 1 was captured; a training feature 1(3) (not shown) which can represent, indicate, and/or convey the specific voltage level that was used to capture the training data candidate 1; a training feature 1(4) (not shown) which can represent, indicate, and/or convey the specific age of a medical patient whose brain is depicted by the training data candidate 1; and/or a training feature 1(5) (not shown) which can represent, indicate, and/or convey the specific size of the brain depicted in the training data candidate 1. Likewise, in such case, the training data candidate n can have: the training feature n(1) which can represent, indicate, and/or convey the specific time/date on which the training data candidate n was captured; a training feature n(2) (not shown) which can represent, indicate, and/or convey the specific geolocation at which the training data candidate n was captured; a training feature n(3) (not shown) which can represent, indicate, and/or convey the specific voltage level that was used to capture the training data candidate n; a training feature n(4) (not shown) which can represent, indicate, and/or convey the specific age of a medical patient whose brain is depicted by the training data candidate n; and/or a training feature n(5) (not shown) which can represent, indicate, and/or convey the specific size of the brain depicted in the training data candidate n.

In various embodiments, the set of ground-truth classifications 304 can respectively correspond (e.g., in one-to-one fashion) to the set of training data candidates 302. Accordingly, since the set of training data candidates 302 can have n training data candidates, the set of ground-truth classifications 304 can have n ground-truth classifications: a ground-truth classification 1 to a ground-truth classification n. In various aspects, each ground-truth classification can be any suitable annotation label having any suitable format and/or dimensionality (e.g., can be one or more scalars, one or more vectors, one or more matrices, one or more tensors, and/or one or more character strings) that can indicate, convey, and/or represent a correct/accurate classification that is known/deemed to correspond to a respective training data candidate. For example, the ground-truth classification 1 can correspond to the training data candidate 1. Thus, the ground-truth classification 1 can be considered as being an annotation label that indicates and/or conveys the class to which the training data candidate 1 is known and/or deemed to belong. As another example, the ground-truth classification n can correspond to the training data candidate n. So, the ground-truth classification n can be considered as being an annotation label that indicates and/or conveys the class to which the training data candidate n is known and/or deemed to belong.

In various aspects, any suitable number and/or types of classes can be represented by the set of ground-truth classifications 304. As a non-limiting example, suppose that each of the set of training data candidates 302 is a medical image depicting an anatomical structure of a medical patient. In such case, the set of ground-truth classifications 304 can indicate/convey whether or not respective training data candidates depict diseased versions or healthy versions of such anatomical structure. For instance, if each training data candidate is a CT scanned image of a patient's liver, then each ground-truth classification can indicate/convey whether the liver depicted by a respective training data candidate has a lesion or does not have a lesion. In such case, the training data candidate 1 can depict the liver of some medical patient, and the ground-truth classification 1 can indicate whether or not the liver depicted by the training data candidate 1 is known/deemed to exhibit a lesion. Similarly, the training data candidate n can depict the liver of some other medical patient, and the ground-truth classification n can indicate whether or not the liver depicted by the training data candidate n is known/deemed to exhibit a lesion. In such case, the set of ground-truth classifications 304 can be considered as representing two classes: a lesion class, and a non-lesion class. As another example, if each training data candidate is a CT scanned image of a patient's artery, then each ground-truth classification can indicate/convey whether the artery depicted by a respective training data candidate is severely occluded, moderately occluded, or not occluded. In such case, the training data candidate 1 can depict the artery of some medical patient, and the ground-truth classification 1 can indicate whether or not the artery depicted by the training data candidate 1 is known/deemed to exhibit a severe occlusion, a moderate occlusion, or no occlusion. Likewise, the training data candidate n can depict the artery of some other medical patient, and the ground-truth classification n can indicate whether or not the artery depicted by the training data candidate n is known/deemed to exhibit a severe occlusion, a moderate occlusion, or no occlusion. In such case, the set of ground-truth classifications 304 can be considered as representing three classes: a severely-occluded class, a moderately-occluded class, and a non-occluded class.

Referring back to FIG. 1, the machine learning classifier 104 can exhibit any suitable artificial intelligence architecture as desired. As a non-limiting example, the machine learning classifier 104 can exhibit a deep learning neural network architecture. In such case, the machine learning classifier 104 can include any suitable number of layers, any suitable numbers of neurons in various layers, any suitable activation functions in various neurons, and/or any suitable interneuron connections and/or interneuron connection patterns. As some other non-limiting examples, the machine learning classifier 104 can exhibit a support vector machine architecture, a naïve Bayes architecture, a linear regression architecture, a logistic regression architecture, a decision tree architecture, and/or a random forest architecture.

In any case, the machine learning classifier 104 can be trained on the annotated training dataset 106. For example, suppose that the machine learning classifier 104 exhibits a neural network architecture. In such case, the internal parameters (e.g., weight matrices, bias values) of the machine learning classifier 104 can be randomly initialized and/or initialized in any other suitable fashion. In various aspects, any given training data candidate can be selected from the annotated training dataset 106, and a given ground-truth classification that corresponds to the given training data candidate can be identified in the annotated training dataset 106. In various instances, the machine learning classifier 104 can be executed on the given training data candidate, thereby yielding some output. More specifically, the training data candidate can be received by an input layer of the machine learning classifier 104, the training data candidate can complete a forward pass through one or more hidden layers of the machine learning classifier 104, and/or an output layer of the machine learning classifier 104 can compute the output based on activations provided by the one or more hidden layers. In various aspects, the output can be considered as an inferred classification label that indicates which class the machine learning classifier 104 believes/ infers that the given training data candidate belongs to. In contrast, the given ground-truth classification can be considered as an annotation label that indicates the class to which the given training data candidate is accurately/correctly known/deemed to belong. In any case, an error and/or loss can be computed between the output and the given ground-truth classification, and such error/loss can drive backpropagation, thereby iteratively updating the internal parameters of the machine learning classifier 104. Such training procedure can be repeated for each training data candidate in the annotated training dataset 106, with the result being that the internal parameters of the machine learning classifier 104 can become iteratively optimized for accurately classifying inputted data candidates. As those having ordinary skill in the art will appreciate, any suitable training batch sizes, any suitable error/loss/objective function, and/or any suitable training termination criterion can be implemented.

In some cases, the training-deployment comparison user-interface system 102 can facilitate and/or perform such training of the machine learning classifier 104.

In various embodiments, it can be desired to execute the machine learning classifier 104 on the data candidate 108. However, because the data candidate 108 can lack a corresponding ground-truth classification, it can be unknown whether or not the machine learning classifier 104 is likely to accurately or inaccurately classify the data candidate 108. As described herein, the training-deployment comparison user-interface system 102 can address this technical problem.

In various embodiments, the training-deployment comparison user-interface system 102 can comprise a processor 110 (e.g., computer processing unit, microprocessor) and a computer-readable memory 112 that is operably and/or operatively and/or communicatively connected/coupled to the processor 110. The computer-readable memory 112 can store computer-executable instructions which, upon execution by the processor 110, can cause the processor 110 and/or other components of the training-deployment comparison user-interface system 102 (e.g., receiver component 114, model component 116, filter component 118, visualization component 120) to perform one or more acts. In various embodiments, the computer-readable memory 112 can store computer-executable components (e.g., receiver component 114, model component 116, filter component 118, visualization component 120), and the processor 110 can execute the computer-executable components.

In various embodiments, the training-deployment comparison user-interface system 102 can comprise a receiver component 114. In various aspects, the receiver component 114 can electronically receive and/or otherwise electronically access the machine learning classifier 104, the annotated training dataset 106, and/or the data candidate 108. In some instances, the receiver component 114 can electronically retrieve the machine learning classifier 104, the annotated training dataset 106, and/or the data candidate 108 from any suitable centralized and/or decentralized databases and/or data structures (not shown), whether remote from and/or local to the receiver component 114. In any case, the receiver component 114 can electronically obtain and/or access the machine learning classifier 104, the annotated training dataset 106, and/or the data candidate 108, such that other components of the training-deployment comparison user-interface system 102 can electronically interact with the machine learning classifier 104, with the annotated training dataset 106, and/or with the data candidate 108.

In various embodiments, the training-deployment comparison user-interface system 102 can further comprise a model component 116. In various aspects, as described herein, the model component 116 can electronically execute the machine learning classifier 104 on the data candidate 108, thereby yielding a predicted classification.

In various embodiments, the training-deployment comparison user-interface system 102 can further comprise a filter component 118. In various instances, as described herein, the filter component 118 can electronically select and/or choose a subset of the annotated training dataset 106, which subset can be referred to as an annotated training subset.

In various embodiments, the training-deployment comparison user-interface system 102 can further comprise a visualization component 120. In various cases, as described herein, the visualization component 120 can electronically generate a confidence graph based on the annotated training subset, based on the data candidate, and/or based on the predicted classification. In various instances, the confidence graph can be considered as a graphical illustration that visually shows how well and/or how poorly the data candidate and the predicted classification fit into and/or fit with the annotated training subset. Accordingly, the confidence graph can be considered as a graphical measure and/or a graphical gauge of how much confidence and/or trust can be placed in the machine learning classifier 104 with respect to the data candidate 108.

Figure 4:
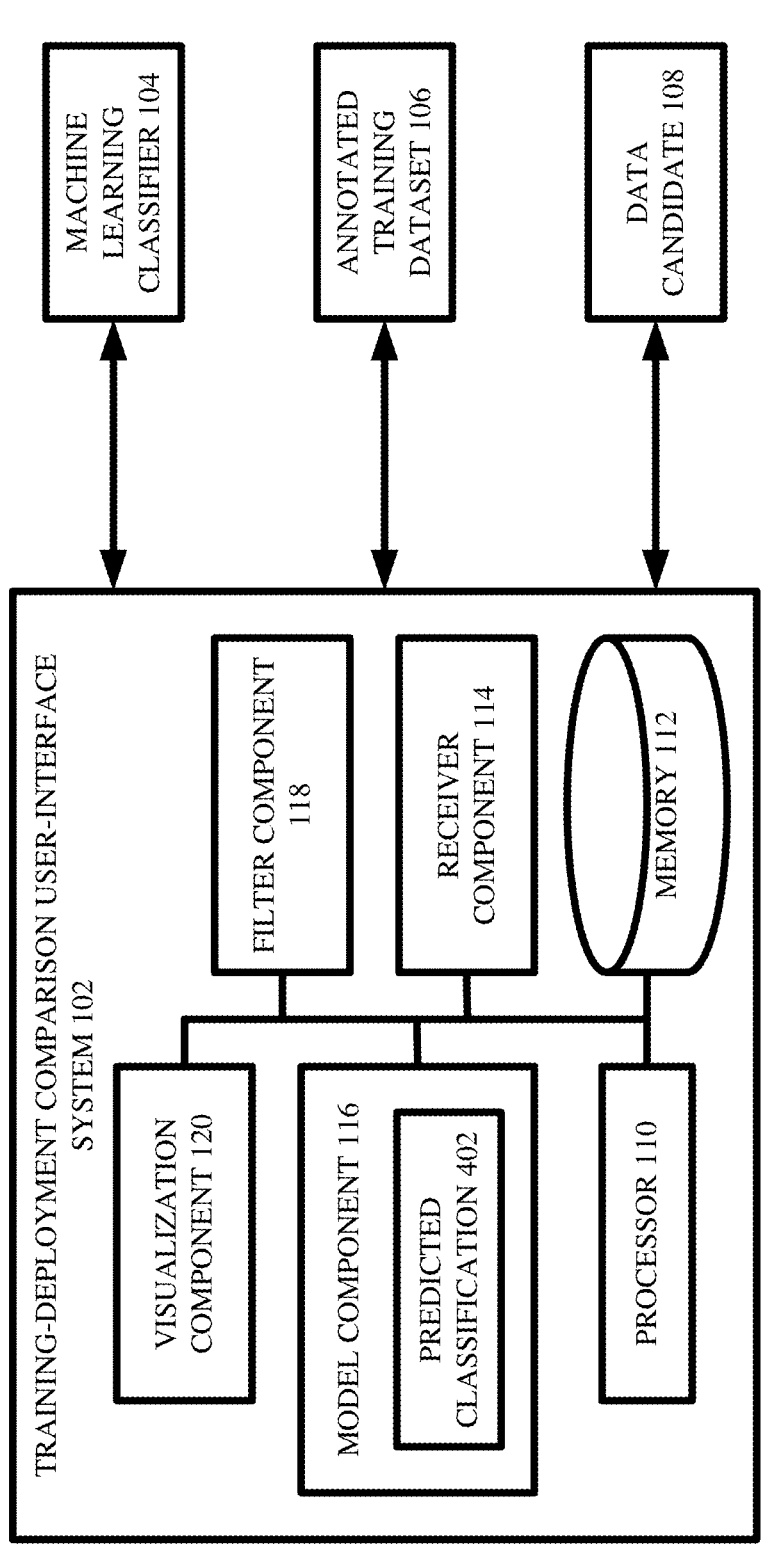
FIG. 4 illustrates a block diagram of an example, non-limiting system including a predicted classification that facilitates dynamic user-interface comparison between machine learning output and training data in accordance with one or more embodiments described herein.

FIG. 4 illustrates a block diagram of an example, non-limiting system 400 including a predicted classification that can facilitate dynamic user-interface comparison between machine learning output and training data in accordance with one or more embodiments described herein. As shown, the system 400 can, in some cases, comprise the same components as the system 100, and can further comprise a predicted classification 402.

In various embodiments, the model component 116 can electronically execute the machine learning classifier 104 on the data candidate 108, and such electronic execution can result in the predicted classification 402. This is described in more detail with respect to FIG. 5.

Figure 5:
FIG. 5 illustrates an example, non-limiting block diagram showing how a predicted classification can be generated based on a data candidate in accordance with one or more embodiments described herein.

FIG. 5 illustrates an example, non-limiting block diagram 500 showing how the predicted classification 402 can be generated based on the data candidate 108 in accordance with one or more embodiments described herein.

In various aspects, as shown, the model component 116 can electronically feed the data candidate 108 as input to the machine learning classifier 104, and the machine learning classifier 104 can electronically compute the predicted classification 402 as output. For example, suppose that the machine learning classifier 104 exhibits a neural network architecture. In such case, an input layer of the machine learning classifier 104 can receive one or more scalars, one or more vectors, one or more matrices, one or more tensors, and/or one or more character strings that collectively represent the data candidate 108, such one or more scalars, vectors, matrices, tensors, and/or character strings can complete a forward pass through one or more hidden layers of the machine learning classifier, and/or an output layer of the machine learning classifier 104 can calculate the predicted classification 402 based on activation maps yielded by the one or more hidden layers.

In any case, the predicted classification 402 can have the same format and/or dimensionality as any one of the set of ground-truth classifications 304, and the predicted classification 402 can be considered as indicating, conveying, and/or otherwise representing the class to which the machine learning classifier 104 believes and/or infers that the data candidate 108 belongs. Because the data candidate 108 does not have a corresponding ground-truth classification, it can be unknown whether the predicted classification 402 is accurate or is instead inaccurate.

Figure 6:
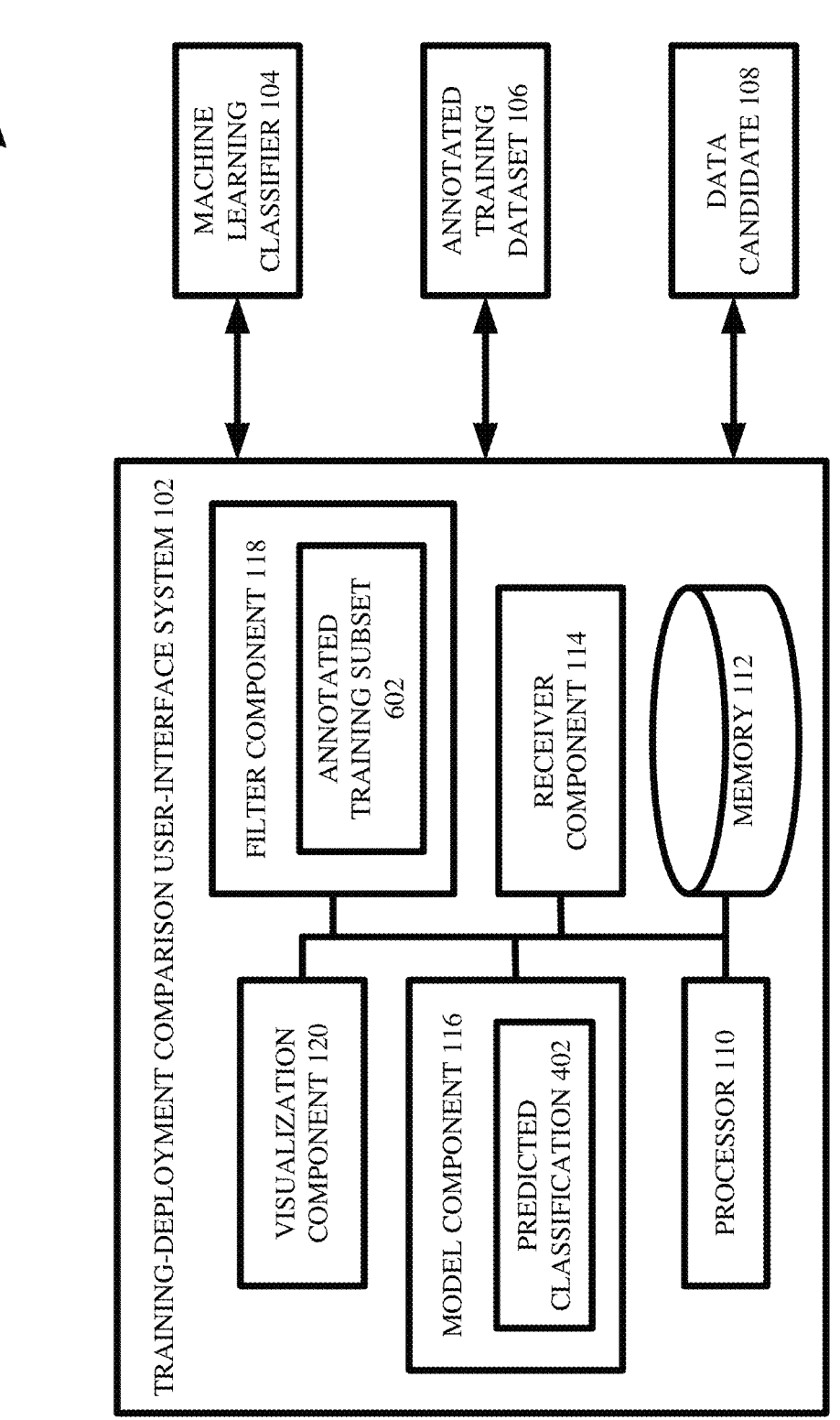
FIG. 6 illustrates a block diagram of an example, non-limiting system including an annotated training subset that facilitates dynamic user-interface comparison between machine learning output and training data in accordance with one or more embodiments described herein.

FIG. 6 illustrates a block diagram of an example, non-limiting system 600 including an annotated training subset that can facilitate dynamic user-interface comparison between machine learning output and training data in accordance with one or more embodiments described herein. As shown, the system 600 can, in some cases, comprise the same components as the system 400, and can further comprise an annotated training subset 602.

In various embodiments, the filter component 118 can electronically select and/or choose the annotated training subset 602 from the annotated training dataset 106. This is further explained with respect to FIG. 7.

Figure 7:
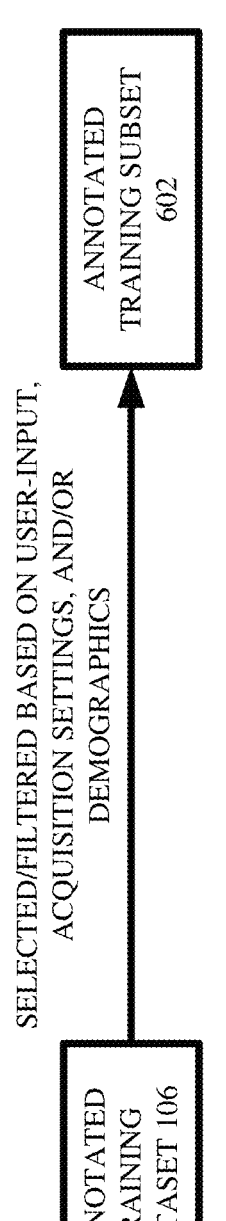
FIG. 7 illustrates an example, non-limiting block diagram showing how an annotated training subset can be selected from an annotated training dataset in accordance with one or more embodiments described herein.

FIG. 7 illustrates an example, non-limiting block diagram 700 showing how the annotated training subset 602 can be selected from the annotated training dataset 106 in accordance with one or more embodiments described herein.

In various embodiments, as shown, the filter component 118 can electronically generate the annotated training subset 602 by applying any selections and/or filtrations to the annotated training dataset 106, where such selections and/or filtrations can be based on user-provided input, can be based on acquisition settings associated with the data candidate 108, and/or can be based on demographics associated with the data candidate 108.

First, consider how user-provided input can be implemented to select/choose the annotated training subset 602. In various aspects, a technician that is operating and/or otherwise overseeing the machine learning classifier 104 can specify, via any suitable human-to-computer interface device (e.g., keyboard, keypad, touchscreen, voice recognition, gesture recognition) one or more ranges of one or more feature variables that are desired to be retained within and/or excluded from the annotated training dataset 106. In various cases, the result of such retainment and/or exclusion can be considered as the annotated training subset 602.

As a non-limiting example, the technician can specify that only those training data candidates in the annotated training dataset 106 that were captured/generated during the second week of February 2022 are to be included in the annotated training subset 602. Conversely, the technician can instead specify those training data candidates in the annotated training dataset 106 that were captured/generated during the second week of February 2022 are to be excluded from the annotated training subset 602.

As another non-limiting example, the technician can specify that only those training data candidates in the annotated training dataset 106 that were captured/generated in the European Union are to be included in the annotated training subset 602. Conversely, the technician can instead specify that those training data candidates in the annotated training dataset 106 that were captured/generated outside the European Union are to be excluded from the annotated training subset 602.

As yet another non-limiting example, the technician can specify that only those training data candidates in the annotated training dataset 106 that correspond to pediatric medical patients are to be included in the annotated training subset 602. Conversely, the technician can instead specify that those training data candidates in the annotated training dataset 106 that correspond to pediatric medical patients are to be excluded from the annotated training subset 602.

As still another non-limiting example, the technician can specify that only those training data candidates in the annotated training dataset 106 that correspond to medical patients that have a smoking habit are to be included in the annotated training subset 602. Conversely, the technician can instead specify that those training data candidates in the annotated training dataset 106 that correspond to medical patients that have a smoking habit are to be excluded from the annotated training subset 602.

As even another non-limiting example, if each of the set of training data candidates 302 is a medical image of a femur, then the technician can specify that only those training data candidates in the annotated training dataset 106 that depict femurs having bone mineral densities of at least 4 grams per square centimeter are to be included in the annotated training subset 602. Conversely, the technician can instead specify that those training data candidates in the annotated training dataset 106 that depict femurs having bone mineral densities of at least 4 grams per square centimeter are to be excluded from the annotated training subset 602.

In this way, the technician can manually select and/or choose, by using feature-based filters, which training data candidates from the annotated training dataset 106 are included in and/or excluded from the annotated training subset 602.

Next, consider how acquisition settings and/or demographics of the data candidate 108 can be leveraged to automatically select/choose the annotated training subset 602. In various aspects, one or more ranges of one or more feature variables that determine which training data candidates are retained in or excluded from the annotated training dataset 106 can be automatically selected to match, mirror, contain, and/or otherwise be within any suitable threshold margins of the specific values of those one or more feature variables that are exhibited by the data candidate 108.

As a non-limiting example, in some cases, the filter component 118 can automatically include in the annotated training subset 602 only those training data candidates from the annotated training dataset 106 that were captured/generated on the same day (e.g., or in the same week, or in the same month, or in the same quarter, or in the same year) as the data candidate 108. In other cases, the filter component 118 can automatically exclude from the annotated training subset 602 those training data candidates from the annotated training dataset 106 that were captured/generated more than one day before or more than one day after (e.g., or more than one week before or after, or more than one month before or after, or more than one quarter before or after, or more than one year before or after) the data candidate 108.

As another non-limiting example, in some cases, the filter component 118 can automatically include in the annotated training subset 602 only those training data candidates from the annotated training dataset 106 that were captured/generated in the same building (e.g., or in the same city, or in the same state, or in the same country, or in the same continent) as the data candidate 108. In other cases, the filter component 118 can automatically exclude from the annotated training subset 602 those training data candidates from the annotated training dataset 106 that were captured/generated outside of the building (e.g., or outside of the city, or outside of the state, or outside of the country, or outside of the continent) where the data candidate 108 was captured/generated.

As yet another non-limiting example, in some cases, the filter component 118 can automatically include in the annotated training subset 602 only those training data candidates from the annotated training dataset 106 that are associated with medical patients having the same gender as a medical patient that is associated with the data candidate 108.

As still another non-limiting example, in some cases, the filter component 118 can automatically include in the annotated training subset 602 only those training data candidates from the annotated training dataset 106 that were captured/generated according to the same acquisition voltage (e.g., or acquisition amperage, or acquisition speed, or reconstruction technique) as the data candidate 108. In other cases, the filter component 118 can automatically exclude from the annotated training subset 602 those training data candidates from the annotated training dataset 106 that were captured/generated according to an acquisition voltage (e.g., or acquisition amperage, or acquisition speed, or reconstruction technique) that is beyond any suitable threshold margin from that with which the data candidate 108 was captured/generated.

As even another non-limiting example, if each training data candidate is a medical image depicting a liver, the filter component 118 can automatically include in the annotated training subset 602 only those training data candidates from the annotated training dataset 106 that depict livers of the same and/or similar size (e.g., or same/similar elongation, or same/similar roundness) as the data candidate 108. In other cases, the filter component 118 can automatically exclude from the annotated training subset 602 those training data candidates from the annotated training dataset 106 that depict livers having a size (e.g., or elongation, or roundness) that exceeds any suitable threshold margin of difference from the size (e.g., or elongation, or roundness) of the liver depicted by the data candidate 108.

In this way, the filter component 118 can automatically choose/select training data candidates from the annotated training dataset 106 based on acquisition settings and/or demographics (and/or other features) associated with the data candidate 108.

Although the herein description mainly describes various embodiments of the filter component 118 as automatically selecting/filtering the annotated training dataset 106 based on acquisition settings and/or demographics associated with the data candidate 108, this is a mere non-limiting example for ease of explanation. In various embodiments, the filter component 118 can automatically select/filter the annotated training dataset 106 based on any other suitable characteristics, properties, and/or attributes of the data candidate 108 as desired (e.g., patient age, patient gender, patient disease condition, patient weight, patient size, acquisition voltage, acquisition amperage, acquisition device model number, contrast injection, noise level, contrast level).

Figure 8:
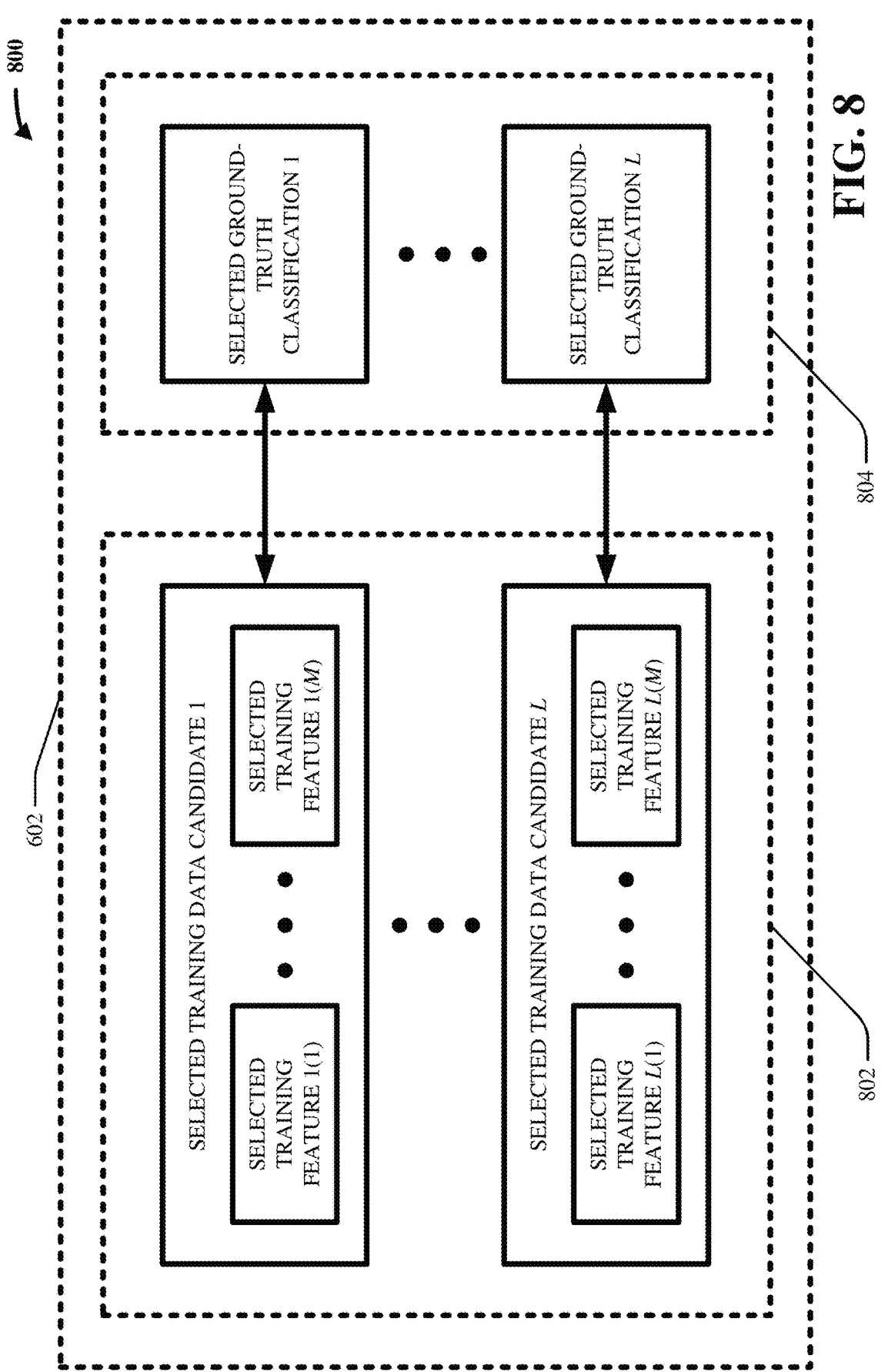
FIG. 8 illustrates an example, non-limiting block diagram of an annotated training subset in accordance with one or more embodiments described herein.

FIG. 8 illustrates an example, non-limiting block diagram 800 of an annotated training subset in accordance with one or more embodiments described herein. That is, FIG. 8 depicts a non-limiting, example embodiment of the annotated training subset 602.

In various embodiments, as shown, the annotated training subset 602 can include a set of selected training data candidates 802 and/or a set of selected ground-truth classifications 804. In various aspects, the set of selected training data candidates 802 can include l training data candidates for any suitable positive integer $1 \leq n$: a selected training data candidate 1 to a selected training data candidate l. In various instances, each of the set of selected training data candidates 802 can have been selected and/or chosen by the filter component 118 from the set of training data candidates 302. Accordingly, each of the set of selected training data candidates 802 can have the same format and/or dimensionality as each of the set of training data candidates 302. Furthermore, each of the set of selected training data candidates 802 can have m features that respectively correspond to the aforementioned m feature variables, just like each of the set of training data candidates 302 (e.g., the selected training data candidate 1 can have a selected training feature 1(1) to a selected training feature 1(m), and the selected training data candidate l can have a selected training feature l(1) to a selected training feature l(m)).

In various embodiments, the set of selected ground-truth classifications 804 can respectively correspond (e.g., in one-to-one fashion) to the set of selected training data candidates 802. Accordingly, since the set of selected training data candidates 802 can have l training data candidates, the set of selected ground-truth classifications 804 can have l ground-truth classifications: a selected ground-truth classification 1 to a selected ground-truth classification l. In various instances, each of the set of selected ground-truth classifications 804 can have been selected and/or chosen by the filter component 118 from the set of ground-truth classifications 304. Accordingly, each of the set of selected ground-truth classifications 804 can have the same format and/or dimensionality as each of the set of ground-truth classifications 304. That is, each selected ground-truth classification can be any suitable annotation label having any suitable format and/or dimensionality (e.g., can be one or more scalars, one or more vectors, one or more matrices, one or more tensors, and/or one or more character strings) that can indicate, convey, and/or represent a correct/accurate classification that is known/deemed to correspond to a respective selected training data candidate. For example, the selected ground-truth classification 1 can correspond to the selected training data candidate 1, meaning that the selected ground-truth classification 1 can be considered as being an annotation label that indicates and/or conveys the class to which the selected training data candidate 1 is known and/or deemed to belong. Similarly, the selected ground-truth classification l can correspond to the selected training data candidate l, meaning that the selected ground-truth classification l can be considered as being an annotation label that indicates and/or conveys the class to which the selected training data candidate l is known and/or deemed to belong.

In some cases, l can be strictly less than n, which can mean that the annotated training subset 602 can have a lower cardinality (e.g., can be smaller) than the annotated training dataset 106. In other cases, l can be equal to n, which can mean that the annotated training subset 602 can be equivalent to the annotated training dataset 106.

Figure 9:
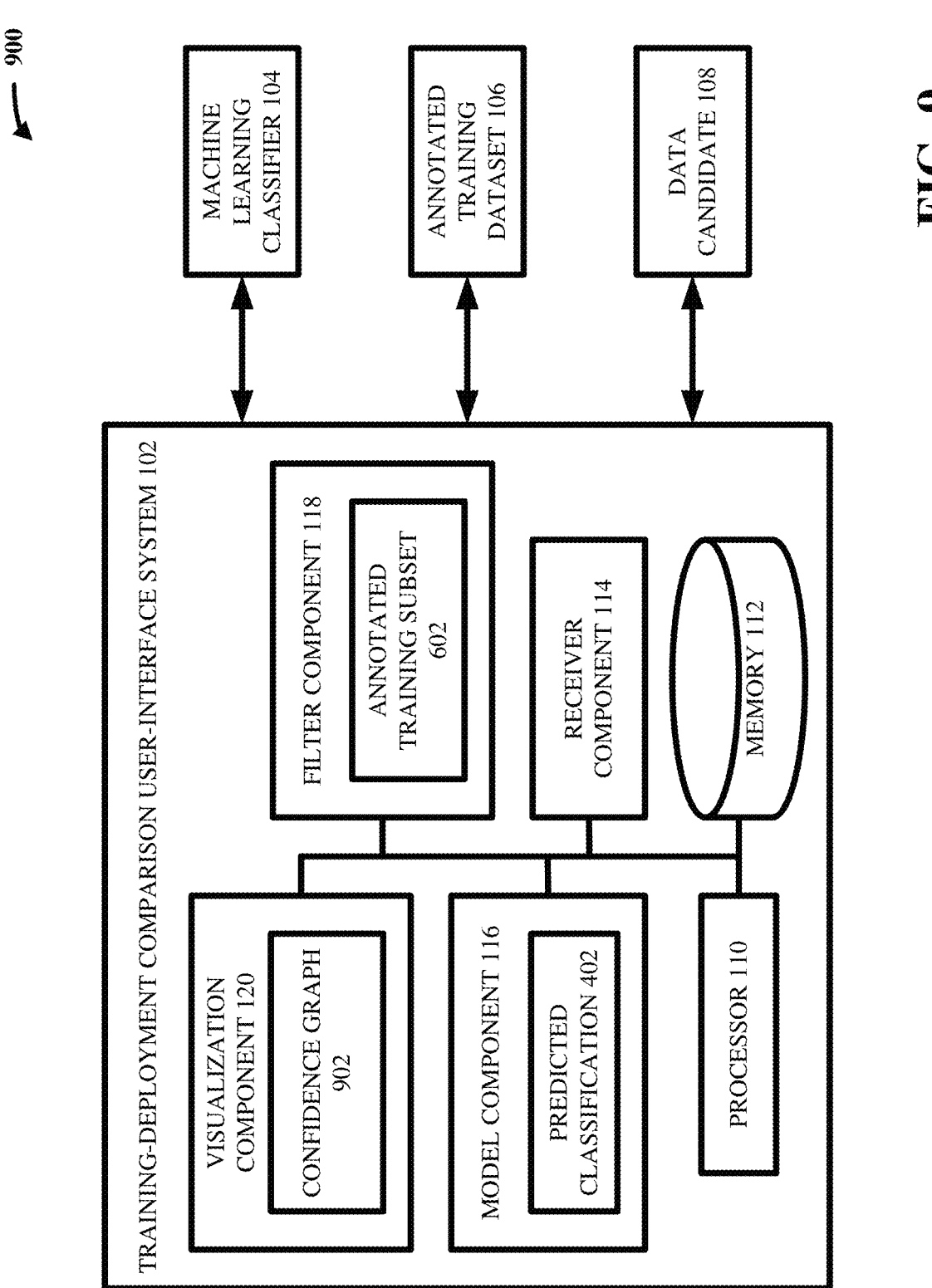
FIG. 9 illustrates a block diagram of an example, non-limiting system including a confidence graph that facilitates dynamic user-interface comparison between machine learning output and training data in accordance with one or more embodiments described herein.

FIG. 9 illustrates a block diagram of an example, non-limiting system 900 including a confidence graph that can facilitate dynamic user-interface comparison between machine learning output and training data in accordance with one or more embodiments described herein. As shown, the system 900 can, in some cases, comprise the same components as the system 600, and can further comprise a confidence graph 902.

In various embodiments, the visualization component 120 can electronically render, on any suitable computer display/screen/monitor, the confidence graph 902, based on the annotated training subset 602, based on the data candidate 108, and/or based on the predicted classification 402. In various aspects, the confidence graph 902 can be considered as a graphical illustration that visually shows how well or how poorly the data candidate 108 and/or the predicted classification 402 fit in with the annotated training subset 602. More specifically, the confidence graph 902 can have one or more coordinate axes that respectively correspond to one or more feature variables. That is, such one or more coordinates axes can respectively span ranges of possible values of those one or more feature variables. In various instances, the annotated training subset 602 can be plotted in the confidence graph 902. In particular, the selected training data candidates in the annotated training subset 602 can be plotted along the one or more coordinate axes and can be color-coded and/or symbol-coded according to their selected ground-truth classifications. In other words, each distinct class of selected training data candidate can be plotted in a respectively corresponding color (e.g., red for a first class, blue for a second class, green for a third class) and/or can be plotted using a respectively corresponding point-symbol shape (e.g., circular point-symbol for a first class, triangular point-symbol for a second class, rectangular point-symbol for a third class). Accordingly, the confidence graph 902 can be considered as visually displaying how the one or more feature variables are distributed throughout the annotated training subset 602. Further still, the data candidate 108 can also be plotted along the one or more coordinate axes and can be color-coded and/or symbol-coded according to the predicted classification 402. In some cases, the plotted point-symbol that is used to represent the data candidate 108 can be of a different size and/or a different shape than the plotted point-symbols used to represent the annotated training subset 602, so as to cause the data candidate 108 to be easily visually distinguishable in the confidence graph 902. In any case, the confidence graph 902 can be considered as a visual/graphical illustration that shows how well and/or how poorly the data candidate 108 and the predicted classification 402 fit into and/or with the annotated training subset 602. In other words, the confidence graph 902 can be considered as graphically/visually showing whether or not the data candidate 108 and/or the predicted classification 402 amount to an outlier when compared to the annotated training subset 602. This is further explained with respect to FIGS. 10-12.

Figure 10:
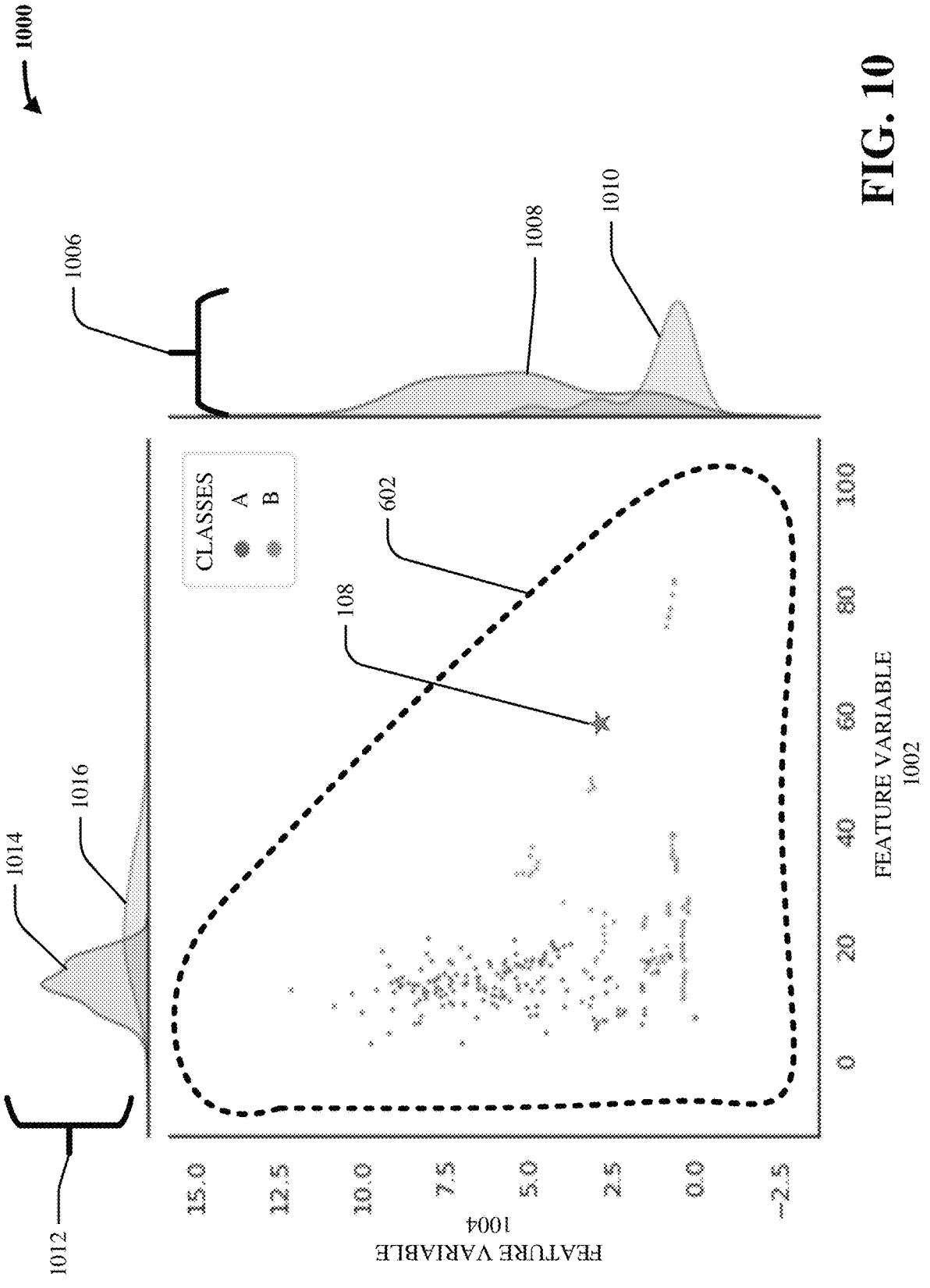
FIG. 10 illustrates an example, non-limiting view of a confidence graph based on a subset of an annotated training dataset in accordance with one or more embodiments described herein.

FIG. 10 illustrates an example, non-limiting view 1000 of a confidence graph based on a subset of an annotated training dataset in accordance with one or more embodiments described herein. In other words, FIG. 10 depicts a non-limiting, example embodiment of the confidence graph 902 that is tabulated when l<n (e.g., when the annotated training subset 602 is strictly smaller than the annotated training dataset 106).

In various embodiments, as shown in FIG. 10, the confidence graph 902 can be a two-dimensional scatterplot in conjunction with two sets of feature distributions. More specifically, as shown, the confidence graph 902 can include an abscissa (e.g., a first coordinate axis, such as an x-axis) and an ordinate (e.g., a second coordinate axis, such as a y-axis). In various aspects, the abscissa can correspond to and/or otherwise be associated with a feature variable 1002, where the feature variable 1002 can be any suitable one of the m aforementioned feature variables. That is, the abscissa can span a range of possible values of the feature variable 1002 (e.g., in the non-limiting example of FIG. 10, the abscissa can span a range beginning at a value of 0 for the feature variable 1002 and ending at a value of 100 for the feature variable 1002). Similarly, in various instances, the ordinate can correspond to and/or otherwise be associated with a feature variable 1004, where the feature variable 1004 can be any suitable one of the m aforementioned feature variables that is different from the feature variable 1002. So, the ordinate can span a range of possible values of the feature variable 1004 (e.g., in the non-limiting example of FIG. 10, the ordinate can span a range beginning at a value of −2.5 for the feature variable 1004 and ending at a value of 15.0 for the feature variable 1004).

Accordingly, the selected training data candidates of the annotated training subset 602 can be plotted along the abscissa according to their respective feature values for the feature variable 1002 and along the ordinate according to their respective feature values for the feature variable 1004. As shown in the non-limiting example of FIG. 10, such selected training data candidates can be plotted using dot-symbols (e.g., each selected training data candidate can be represented in the confidence graph 902 by a dot). Furthermore, in various aspects, the selected training data candidates of the annotated training subset 602 can be color-coded according to their respective selected ground-truth classifications. That is, each distinct class that is represented in the set of selected ground-truth classifications 804 can be plotted in the confidence graph 902 according to a distinct color. In the non-limiting example of FIG. 10, there can be two distinct classes: a class A and a class B. Accordingly, there can be two distinct colors in the confidence graph 902: a first color representing the class A and a second color representing the class B. In the non-limiting example of FIG. 10, the color blue can represent the class A, and the color orange can represent the class B. In such case, each blue dot in the confidence graph 902 can be considered as one of the set of selected training data candidates 802 whose selected ground-truth classification indicates that it belongs to the class A, and each orange dot in the confidence graph 902 can be considered as one of the set of selected training data candidates 802 whose selected ground-truth classification indicates that it belongs to the class B.

In various aspects, the data candidate 108 can also be plotted along the abscissa according to its respective feature value for the feature variable 1002 and along the ordinate according to its respective feature value for the feature variable 1004. In various instances, to help make the data candidate 108 easily visually distinguishable in the confidence graph 902, the data candidate 108 can be plotted in the confidence graph 902 using a differently-shaped and/or differently-sized point-symbol as compared to the point-symbols used to plot the annotated training subset 602. In the non-limiting example of FIG. 10, the data candidate 108 can be plotted using a star-shaped point-symbol. Because such star-shaped point-symbol is larger and different than the dot-shaped point-symbols used to plot the annotated training subset 602, the data candidate 108 can be easily noticed in the confidence graph 902. Furthermore, in various aspects, the data candidate 108 can be color-coded according to the predicted classification 402. In the non-limiting example of FIG. 10, the star-shaped point-symbol that represents the data candidate 108 can be colored blue. This can mean that the predicted classification 402 indicates/conveys that the data candidate 108 belongs (e.g., is believed/inferred by the machine learning classifier 104 to belong) to the class A. If the predicted classification 402 instead indicated/conveyed that the data candidate 108 belongs (e.g., is believed/inferred by the machine learning classifier 104 to belong) to the class B, the star-shaped point-symbol could instead be colored orange.

In various aspects, the confidence graph 902 can further include one or more sets of feature distributions that respectively correspond to the feature variables represented by the coordinate axes of the confidence graph 902. In the non-limiting example of FIG. 10, the confidence graph 902 can have two coordinate axes as described above: an abscissa that spans possible values of the feature variable 1002, and an ordinate that spans possible values of the feature variable 1004. Accordingly, the confidence graph 902 can include two sets of feature distributions that respectively correspond to such two coordinate axes: a first set of feature distributions 1006 that correspond to the ordinate and/or to the feature variable 1004, and a second set of feature distributions 1012 that correspond to the abscissa and/or to the feature variable 1002.

In various aspects, the first set of feature distributions 1006 can depict, in color-coded fashion, how the frequency and/or probability density of the set of selected training data candidates 802 is distributed across the feature variable 1004. More specifically, the first set of feature distributions 1006 can include a distinct feature distribution per distinct class, where such distinct feature distribution can be tabulated across the range of possible values of the feature variable 1004. Because there can be two classes (e.g., class A and class B) in the non-limiting example of FIG. 10, the first set of feature distributions 1006 can include two feature distributions: a feature distribution 1008 that can correspond to the class A, and a feature distribution 1010 that can correspond to the class B. Because the color blue in this non-limiting example can represent the class A, the feature distribution 1008 can be shown in blue. In any case, the feature distribution 1008 can show how frequency and/or probability density of those selected training data candidates that are known to belong to the class A vary for different values of the feature variable 1004. Likewise, because the color orange in this non-limiting example can represent the class B, the feature distribution 1010 can be shown in orange. So, the feature distribution 1010 can show how frequency and/or probability density of those selected training data candidates that are known to belong to the class B vary for different values of the feature variable 1004.

Just as above, in various aspects, the second set of feature distributions 1012 can depict, in color-coded fashion, how the frequency and/or probability density of the set of selected training data candidates 802 is distributed across the feature variable 1002. More specifically, the second set of feature distributions 1012 can include a distinct feature distribution per distinct class, where such distinct feature distribution can be tabulated across the range of possible values of the feature variable 1002. Again, because there can be two classes (e.g., class A and class B) in the non-limiting example of FIG. 10, the second set of feature distributions 1012 can include two feature distributions: a feature distribution 1014 that can correspond to the class A, and a feature distribution 1016 that can correspond to the class B. Because the color blue in this non-limiting example can represent the class A, the feature distribution 1014 can be shown in blue. In any case, the feature distribution 1014 can show how frequency and/or probability density of those selected training data candidates that are known to belong to the class A vary for different values of the feature variable 1002. Likewise, because the color orange in this non-limiting example can represent the class B, the feature distribution 1016 can be shown in orange. So, the feature distribution 1016 can show how frequency and/or probability density of those selected training data candidates that are known to belong to the class B vary for different values of the feature variable 1002.

As can be seen in FIG. 10, the confidence graph 902 can be considered as visually displaying how the annotated training subset 602 is distributed according to the feature variable 1002 and the feature variable 1004. Moreover, because the confidence graph 902 can also include the data candidate 108 color-coded according to the predicted classification 402, the confidence graph 902 can further be considered as showing how well and/or how poorly the data candidate 108 and/or the predicted classification 402 fit within such distribution of the annotated training subset 602. Accordingly, the technician that is operating and/or overseeing the machine learning classifier 104 can visually inspect the confidence graph 902 and can understand how much confidence and/or trust to place in the predicted classification 402. For instance, in the non-limiting example of FIG. 10, it can be seen (e.g., by the blue color of the star-shaped point-symbol) that the data candidate 108 is predicted/inferred to belong to the class A. However, it can further be seen that the data candidate 108 is located at a position that is rather far away from other selected training data candidates that are known to belong to class A and that is rather close to selected training data candidates that are known to belong to class B. In other words, the predicted classification 402 in this non-limiting example indicates that the data candidate 108 belongs to the class A, but the specific values of the data candidate 108 with respect to the feature variable 1002 and/or the feature variable 1004 are more similar to those of selected training data candidates that are known to belong to class B. In such case, it can be inferred and/or concluded that the data candidate 108 and/or the predicted classification 402 collectively constitute an outlier when compared to the annotated training subset 602. Thus, the technician that is operating/overseeing the machine learning classifier 104 can know to have less confidence and/or less trust in the predicted classification 402. Note that such inference, conclusion, and/or judgment as to how much confidence and/or trust to place in the predicted classification 402 can be achieved notwithstanding that the data candidate 108 can lack a ground-truth classification. In other words, the confidence graph 902 can be considered as compensating for the absence of a ground-truth annotation label for the data candidate 108.

Figure 11:
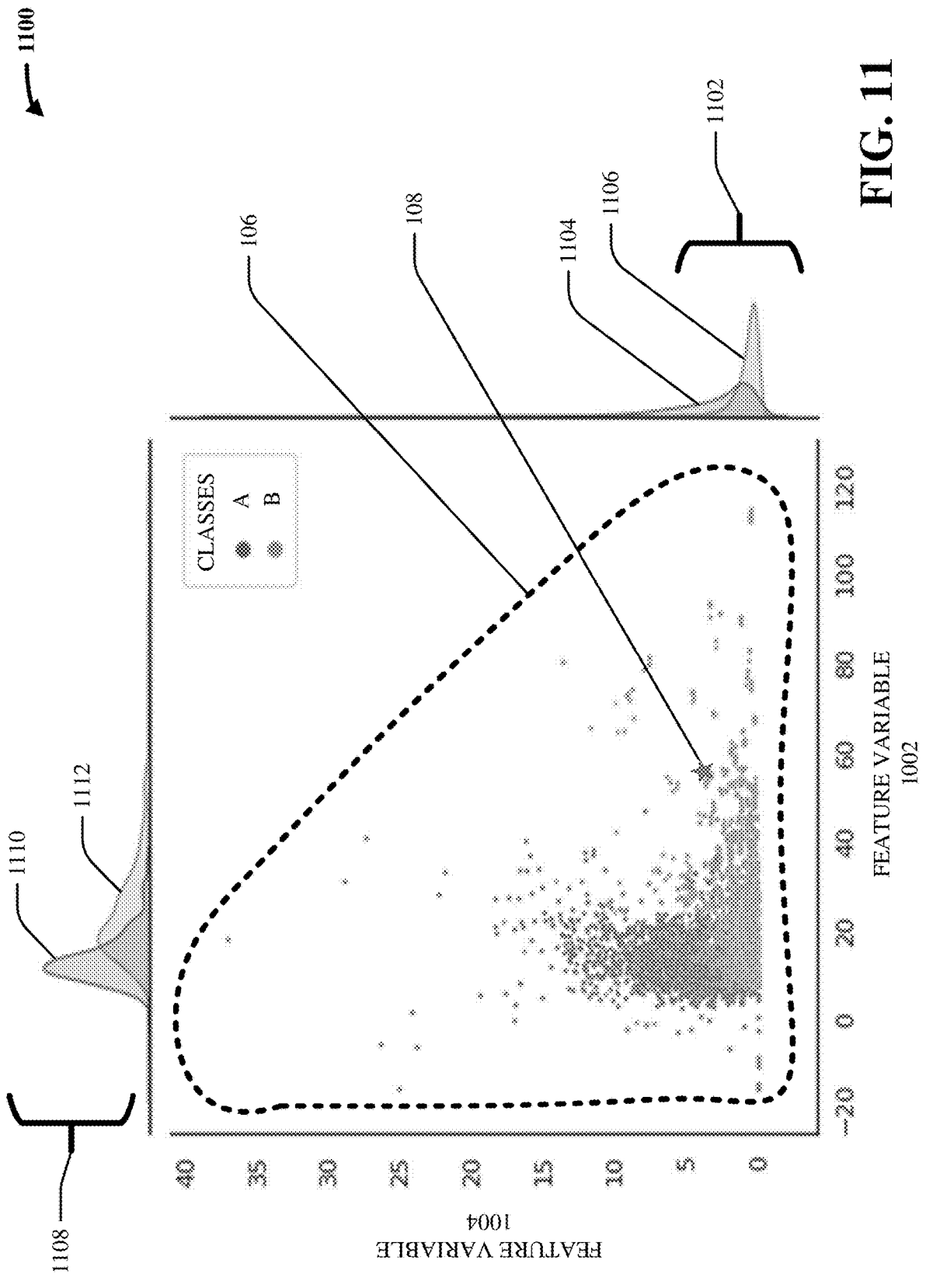
FIG. 11 illustrates an example, non-limiting view of a confidence graph based on an entirety of an annotated training dataset in accordance with one or more embodiments described herein.

FIG. 11 illustrates an example, non-limiting view 1100 of a confidence graph based on an entirety of an annotated training dataset in accordance with one or more embodiments described herein. In other words, FIG. 11 depicts a non-limiting, example embodiment of the confidence graph 902 that is tabulated when l=n (e.g., when the annotated training subset 602 is equivalent to the annotated training dataset 106).

As shown in FIG. 11, the abscissa, ordinate, feature variable 1002, and feature variable 1004 can be as described above with respect to FIG. 10. As further shown, in situations where l=n, the entirety of the annotated training dataset 106 can be plotted in the confidence graph 902. That is, the set of training data candidates 302 can be plotted along to the abscissa according to their specific values for the feature variable 1002 and along the ordinate according to their specific values for the feature variable 1004. Furthermore, such plotted points can be color-coded (and/or symbol-coded, in some cases) according to class (e.g., blue dots can represent training data candidates that are known to belong to the class A, and orange dots can represent training data candidates that are known to belong to the class B). Further still, there can be a distinct set of color-coded feature distributions per coordinate axis and/or per feature variable. For example, as shown, there can be a first set of feature distributions 1102 that includes a feature distribution 1104 and a feature distribution 1106. In various cases, the feature distribution 1104 can show how frequency/probability density of those training data candidates that are known/deemed to belong to the class A (e.g., hence the blue color of the feature distribution 1104) vary across different values of the feature variable 1004, and the feature distribution 1106 can show how frequency/probability density for those training data candidates that are known/deemed to belong to the class B (e.g., hence the orange color of the feature distribution 1106) vary across different values of the feature variable 1004. As another example, there can be a second set of feature distributions 1108 that includes a feature distribution 1110 and a feature distribution 1112. In various aspects, the feature distribution 1110 can show how frequency/probability density of those training data candidates that are known/deemed to belong to the class A (e.g., hence the blue color of the feature distribution 1110) vary across different values of the feature variable 1002, and the feature distribution 1112 can show how frequency/probability density for those training data candidates that are known/deemed to belong to the class B (e.g., hence the orange color of the feature distribution 1112) vary across different values of the feature variable 1002.

In any case, the confidence graph 902 shown in FIG. 11 can visually illustrate how well and/or how poorly the data candidate 108 and/or the predicted classification 402 fit within the annotated training dataset 106. Accordingly, the technician operating/overseeing the machine learning classifier 104 can know and/or understand how much confidence/trust to place with the predicted classification 402, notwithstanding that the data candidate 108 can lack a ground-truth classification.

In various embodiments, the visualization component 120 can electronically render, on any suitable electronic display/screen/monitor, the confidence graph 902 and the data candidate 108, such that the confidence graph 902 and data candidate 108 are adjacent to each other. A non-limiting example of this is shown in FIG. 12.

FIG. 12 illustrates an example, non-limiting medical graphical user interface 1200 depicting a confidence graph in accordance with one or more embodiments described herein. In the non-limiting example of FIG. 12, the data candidate 108 can be a CT scanned image of a patient's liver, and the machine learning classifier 104 can be configured to classify such CT scanned images of patients' livers into one of two classes: a lesion class and a non-lesion class. As shown in the non-limiting example of FIG. 12, the visualization component 120 can electronically render a CT scanned image of a patient's liver (e.g., the data candidate 108) on a left side of the medical graphical user interface 1200, and can further electronically render a confidence graph (e.g., the confidence graph 902) on a right side of the medical graphical user interface 1200, such that the confidence graph and the CT scanned image are adjacent to each other. In various aspects, such a graphical user interface can provide more visual information to the technician that is operating/overseeing the machine learning classifier 104.

Figure 13:
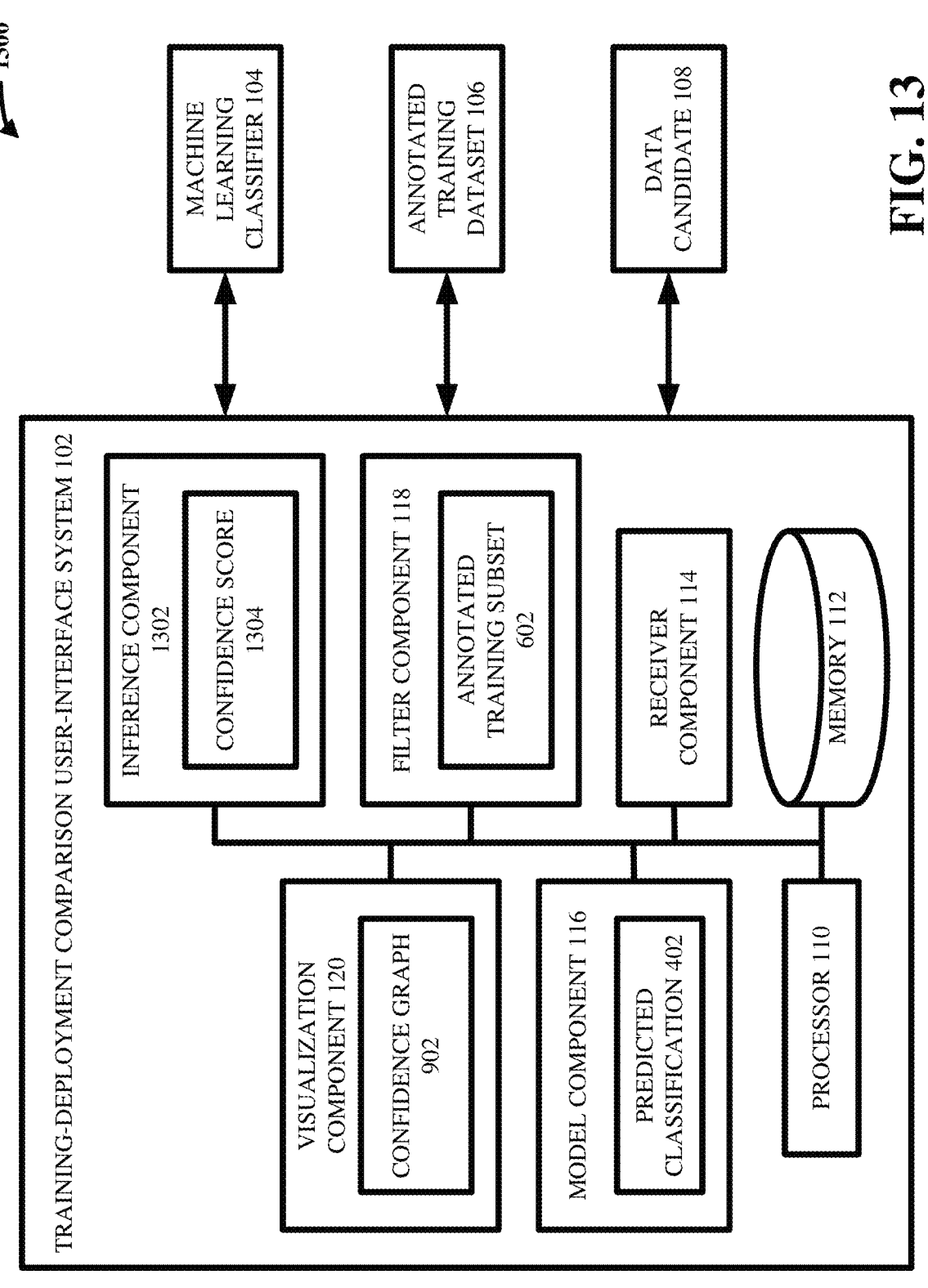
FIG. 13 illustrates a block diagram of an example, non-limiting system including an inference component that facilitates dynamic user-interface comparison between machine learning output and training data in accordance with one or more embodiments described herein.

FIG. 13 illustrates a block diagram of an example, non-limiting system 1300 including an inference component that can facilitate dynamic user-interface comparison between machine learning output and training data in accordance with one or more embodiments described herein. As shown, the system 1300 can, in some cases, comprise the same components as the system 900, and can further comprise an inference component 1302.

In various embodiments, the inference component 1302 can electronically generate and/or electronically calculate a confidence score 1304 based on the confidence graph 902. In various aspects, the confidence score 1304 can be one or more scalars, one or more vectors, one or more matrices, one or more tensors, and/or one or more character strings that quantifies how much confidence and/or how much trust can be appropriately placed in the predicted classification 402. In various instances, the inference component 1302 can compute the confidence score 1304 based on relative distances between the data candidate 108 and the means of one or more sets of feature distributions of the annotated training subset 602 (and/or of the annotated training dataset 106).

As a non-limiting example, consider again the second set of feature distributions 1012 of FIG. 10. As can be seen in FIG. 10, the value of the data candidate 108 with respect to the feature variable 1002 can be closer to the mean of the feature distribution 1016 than to the mean of the feature distribution 1014. Accordingly, it can be inferred/concluded that the data candidate 108 is more likely to belong to the feature distribution 1016 (which represents the class B) than to the feature distribution 1014 (which represents the class A). Because the predicted classification 402 can indicate that the data candidate 108 is inferred/believed to belong to the class A, it can be concluded that the predicted classification 402 is not likely to be accurate in light of the second set of feature distributions 1012. In such case, the inference component 1302 can compute the confidence score 1304 so as to convey and/or indicate such low likelihood of accuracy. In some cases, the confidence score 1304 can be computed as a ratio between: the distance separating the data candidate 108 from the mean of the feature distribution 1016; and the distance separating the data candidate 108 from the mean of the feature distribution 1014.

More generally, for any given set of feature distributions and no matter how many distinct classes are represented by such given set of feature distributions, the confidence score 1304 can be equal to and/or otherwise based on a ratio between: the distance separating the data candidate 108 from the mean of the feature distribution that is closest and/or nearest to the data candidate 108 (e.g., this distance can be the numerator); and the distance separating the data candidate 108 from the mean of the feature distribution that represents the same class as that indicated by the predicted classification 402 (e.g., this distance can be the denominator). In such case, if such ratio is equal to unity, this can mean that the feature distribution whose mean is nearest to the data candidate 108 represents the same class that the predicted classification 402 indicates. On the other hand, if such ratio is less than unity, this can mean that the feature distribution whose mean is nearest to the data candidate 108 represents a different class than that indicated by the predicted classification 402. In any case, this procedure for computing confidence scores can yield a distinct confidence score per distinct feature variable that is plotted in the confidence graph 902. Accordingly, such distinct confidence scores can be aggregated (e.g., averaged together) in any suitable fashion to yield one cumulative confidence score.

Even in cases where the confidence score 1304 is not implemented, any and/or all of the above-mentioned distances can be textually called out and/or indicated on, in, and/or by the confidence graph 902.

FIG. 14 illustrates a flow diagram of an example, non-limiting computer-implemented method 1400 that can facilitate dynamic user-interface comparison between machine learning output and training data in accordance with one or more embodiments described herein. In various cases, the training-deployment comparison user-interface system 102 can facilitate the computer-implemented method 1400.

In various embodiments, act 1402 can include accessing, by a device (e.g., via 114) operatively coupled to a processor, a data candidate (e.g., 108) on which a machine learning classifier (e.g., 104) is to be executed.

In various instances, act 1404 can include generating, by the device (e.g., via 116) and via execution of the machine learning classifier, a predicted classification (e.g., 402) based on the data candidate, wherein the machine learning classifier can receive as input the data candidate, and/or wherein the machine learning classifier can produce as output the predicted classification.

In various cases, act 1406 can include rendering, by the device (e.g., via 120) and on an electronic display, a confidence graph (e.g., 902) that visually depicts how well or how poorly the data candidate and the predicted classification fit into an annotated training dataset (e.g., 106) on which the machine learning classifier has been trained, wherein the confidence graph can include at least one coordinate axis (e.g., ordinate and/or abscissa as shown in FIGS. 10-11) that respectively corresponds to at least one data feature (e.g., 1002 and/or 1004), wherein at least some portion (e.g., 602) of the annotated training dataset can be plotted in the confidence graph along the at least one coordinate axis and can be color-coded or symbol-coded according to ground-truth classification (e.g., as shown in FIGS. 10-11), and/or wherein the data candidate can be plotted in the confidence graph along the at least one coordinate axis and is color-coded or symbol-coded according to the predicted classification (e.g., as shown in FIGS. 10-11).

Although not explicitly shown in FIG. 14, the data candidate can be plotted in the confidence graph according to a different size and/or a different shape than the at least some portion of the annotated training dataset (e.g., as shown in FIGS. 10-11).

Although not explicitly shown in FIG. 14, the confidence graph can be a one-dimensional histogram, a two-dimensional scatterplot, and/or a three-dimensional scatterplot.

Although not explicitly shown in FIG. 14, wherein the confidence graph can be a scatterplot, and wherein the confidence graph can include a first set of feature distributions (e.g., 1012) of the at least some portion of the annotated training dataset, wherein the first set of feature distributions corresponds to a first data feature (e.g., 1002) of the at least one data feature, and wherein the first set of feature distributions is color-coded or symbol-coded according to ground-truth classification.

Although not explicitly shown in FIG. 14, the confidence graph can identify which (e.g., 1014 or 1016) of the first set of feature distributions has a mean that is nearest to (and/or farthest from) the data candidate.

Although not explicitly shown in FIG. 14, the computer-implemented method 1400 can further comprise: selecting, by the device (e.g., via 118), the at least some portion of the annotated training dataset, based on user-provided input.

Although not explicitly shown in FIG. 14, the computer-implemented method 1400 can further comprise: selecting, by the device (e.g., via 118), the at least some portion of the annotated training dataset, based on the data candidate (e.g., acquisition settings associated with the data candidate; patient demographics associated with the data candidate; any other suitable properties, attributes, characteristics associated with the data candidate).

Although not explicitly shown in FIG. 14, the data candidate can be a medical image that depicts an anatomical structure (e.g., liver) of a medical patient, wherein the predicted classification can be a pathology diagnosis (e.g., lesion versus no lesion), and/or wherein the at least one data feature an include a size metric (e.g., liver elongation) or a shape metric (e.g., liver roundness) associated with the anatomical structure.

Accordingly, various embodiments described herein can be considered as a computerized tool that can electronically render, on any suitable computer screen, a confidence graph, where such confidence graph can graphically show how well and/or how poorly the deployment/inferencing results of a machine learning classifier fit with the data and ground-truth annotations on which the machine learning classifier was trained. Such a computerized tool can enable a technician who is overseeing/operating the machine learning classifier to understand how much confidence and/or trust to place with the deployment/inferencing results of the machine learning classifier, even in the absence of ground-truth annotations that correspond to those deployment/inferencing results. Such a computerized tool is thus certainly a useful and practical application of computers.

Although the herein disclosure mainly describes various embodiments as applying to data on which the machine learning classifier 104 has been trained, this is a mere non-limiting example for ease of explanation/illustration. In various other embodiments, the herein-described teachings can be applied so as to compare the data candidate 108 and/or the predicted classification 402 to any suitable reference dataset, even if the machine learning classifier 104 has not been trained on such reference dataset.

Although the herein disclosure mainly describes various embodiments of the receiver component 114 receiving, retrieving, obtaining, and/or otherwise accessing the annotated training dataset 106, this is a mere non-limiting example for ease of explanation. In various embodiments, the receiver component 114 can refrain from accessing the entirety of the annotated training dataset 106. Instead, in such cases, the receiver component 114 can access the data features (e.g., training feature 1(1) to training feature 1(m), training feature n(1) to training feature n(m)) and/or annotated ground-truth classifications (e.g., ground-truth classification 1 to ground-truth classification n) of the annotated training dataset 106. As a non-limiting example, suppose that each training data candidate in the annotated training dataset 106 is a two-dimensional medical image. In such case, the receiver component 114 need not receive, retrieve, obtain, and/or access all of such two-dimensional medical images. Instead, the receiver component 114 can receive, retrieve, obtain, and/or access the data features (e.g., size metrics, shape metrics, max pixel intensity values, min pixel intensity values, average pixel intensity values) and ground-truth annotations that correspond to all of those two-dimensional medical images. In other words, the two-dimensional medical images themselves can be not needed to generate the confidence graph 902. Instead, the data features and/or ground-truth annotations, in the absence of the two-dimensional medical images themselves, can be sufficient to generate the confidence graph 902.

Although the herein disclosure mainly describes various embodiments of the confidence graph 902 as being a histogram, a scatterplot, and/or a combination thereof, this is a mere non-limiting example for ease of explanation and/or illustration. In various other embodiments, the confidence graph 902 can be formatted in any other suitable fashion as desired, so as to visually show how well and/or how poorly the data candidate 108 and/or the predicted classification 402 fit into and/or with the annotated training subset 602. As a non-limiting example, the confidence graph 902 can, in some cases, be formatted as a heat map. As another non-limiting example, the confidence graph 902 can, in other cases, be formatted as a density map. As still another non-limiting example, the confidence graph 902 can, in various cases, be formatted as a t-distributed stochastic neighbor embedding (t-SNE). As those having ordinary skill in the art will appreciate, in any of these cases, the confidence graph 902 can be considered as visually displaying/plotting training data candidates that have more similar features as being close together, and/or as visually displaying/plotting training data candidates that have less similar features as being farther apart (e.g., distance between any two plotted training data candidates can be considered as indicating how similar/dissimilar those two training data candidates are with respect to each other). Accordingly, in any of such cases, the physical distances in the confidence graph 902 that separate the data candidate 108 and/or the predicted classification 402 from the plotted training data candidates can be considered as indicating how well and/or how poorly the data candidate 108 and/or the predicted classification 402 fit into the annotated training subset 602.

In various instances, machine learning algorithms and/or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features and/or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on))

schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=$confidence (class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments. For ease of description and/or explanation, various portions of the herein disclosure utilize the term "each" when discussing various embodiments. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments, and it should be further understood that, in various other embodiments, it can be the case that such description applies to fewer than "each" of that particular object and/or component.

Figure 15:
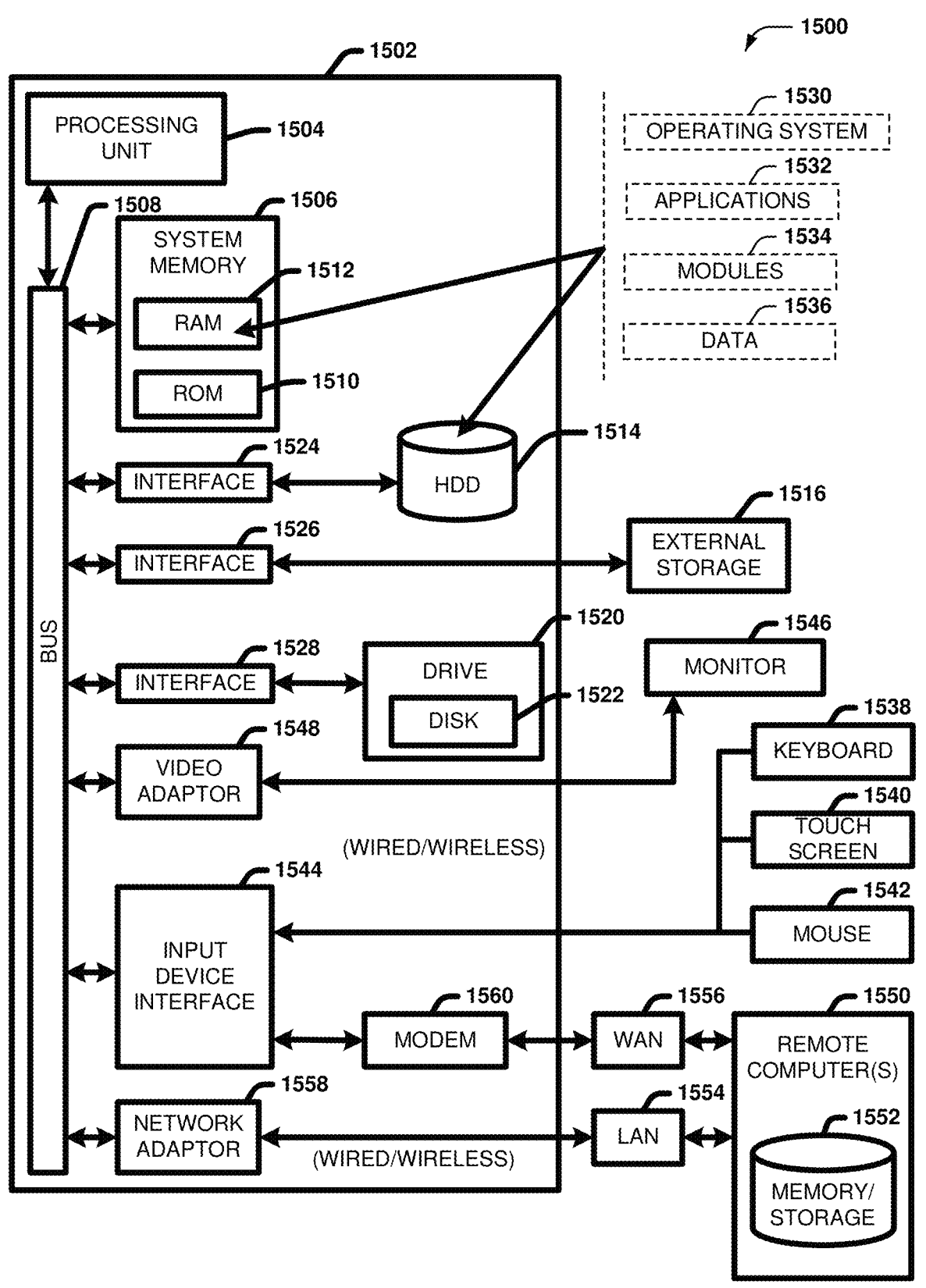
FIG. 15 illustrates a block diagram of an example, non-limiting operating environment in which one or more embodiments described herein can be facilitated.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD), a memory stick or flash drive reader, a memory card reader, etc.) and a drive 1520, e.g., such as a solid state drive, an optical disk drive, which can read or write from a disk 1522, such as a CD-ROM disc, a DVD, a BD, etc. Alternatively, where a solid state drive is involved, disk 1522 would not be included, unless separate. While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and drive 1520 can be connected to the system bus 1508 by an HDD interface 1524, an external storage interface 1526 and a drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above, such as but not limited to a network virtual machine providing one or more aspects of storage or processing of information. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 16 is a schematic block diagram of a sample computing environment 1600 with which the disclosed subject matter can interact. The sample computing environment 1600 includes one or more client(s) 1610. The client(s) 1610 can be hardware and/or software (e.g., threads, processes, computing devices). The sample computing environment 1600 also includes one or more server(s) 1630. The server(s) 1630 can also be hardware and/or software (e.g., threads, processes, computing devices). The servers 1630 can house threads to perform transformations by employing one or more embodiments as described herein, for example. One possible communication between a client 1610 and a server 1630 can be in the form of a data packet adapted to be transmitted between two or more computer processes. The sample computing environment 1600 includes a communication framework 1650 that can be employed to facilitate communications between the client(s) 1610 and the server(s) 1630. The client(s) 1610 are operably connected to one or more client data store(s) 1620 that can be employed to store information local to the client(s) 1610. Similarly, the server(s) 1630 are operably connected to one or more server data store(s) 1640 that can be employed to store information local to the servers 1630.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a memory configured to store computer-executable components; and a processor configured to execute at least one of the computer-executable components that accesses a data candidate on which a machine learning classifier is to be executed;

generates, via execution of the machine learning classifier, a predicted classification based on the data candidate, wherein the machine learning classifier receives as input the data candidate, and wherein the machine learning classifier produces as output the predicted classification; and renders, on an electronic display, a confidence graph that visually depicts how well or how poorly the data candidate and the predicted classification fit into an annotated training dataset on which the machine learning classifier has been trained, wherein the confidence graph comprises at least one feature-based coordinate axis that respectively corresponds to at least one data feature, wherein at least some portion of the annotated training dataset is plotted in the confidence graph along the at least one feature-based coordinate axis and is color-coded or symbol-coded according to respective ground-truth classifications of a group of ground-truth classifications, wherein the data candidate is plotted in the confidence graph along the at least one feature-based coordinate axis and is color-coded or symbol-coded according to a ground-truth classification of the group of ground-truth classifications corresponding to the predicted classification, and wherein the confidence graph concurrently depicts a visual representation of:

the ground-truth classification corresponding to the predicted classification, and for respective data feature of the at least one data feature, a set of overlapping respective feature distribution representations of feature distributions for the respective ground-truth classifications of the group of ground-truth classifications.

2. The system of claim 1, wherein the confidence graph concurrently depicts the visual representation further of relative distances between the data candidate and respective subsets of training data candidates of the at least some portion of the annotated training dataset associated with each ground-truth classification of the group of ground-truth classifications.

3. The system of claim 2, wherein the relative distances between the data candidate and the respective subsets of training data candidates are depicted via a scatterplot, and wherein the respective feature distribution representations are color-coded or symbol-coded according to the respective ground-truth classifications.

4. The system of claim 3, wherein the confidence graph indicates, via the set of overlapping respective feature distribution representations of the feature distributions for the respective data feature and the respective ground-truth classifications, which of the feature distributions for the respective data feature has a mean that is nearest to the data candidate.

5. The system of claim 1, wherein the confidence graph comprises at least one of a one-dimensional histogram, a two-dimensional scatterplot, a three-dimensional scatterplot, a heat map, a density map, or a t-distributed stochastic neighbor embedding plot.

6. The system of claim 1, wherein the at least one of the computer-executable components further:

selects the at least some portion of the annotated training dataset based on user-provided input.

7. The system of claim 1, wherein the at least one of the computer-executable components further:

selects the at least some portion of the annotated training dataset based on the data candidate.

8. The system of claim 1, wherein the data candidate is a medical image that depicts an anatomical structure of a medical patient, wherein the predicted classification is a pathology diagnosis, and wherein the at least one data feature comprises at least one of a size metric or a shape metric associated with the anatomical structure.

9. A computer-implemented method, comprising: accessing, by a system operatively coupled to a processor, a data candidate on which a machine learning classifier is to be executed;

generating, by the system and via execution of the machine learning classifier, a predicted classification based on the data candidate, wherein the machine learning classifier receives as input the data candidate, and wherein the machine learning classifier produces as output the predicted classification; and rendering, by the system and on an electronic display, a confidence graph that visually depicts how well or how poorly the data candidate and the predicted classification fit into an annotated training dataset on which the machine learning classifier has been trained, wherein the confidence graph comprises at least one feature-based coordinate axis that respectively corresponds to at least one data feature, wherein at least some portion of the annotated training dataset is plotted in the confidence graph along the at least one feature-based coordinate axis and is color-coded or symbol-coded according to respective ground-truth classifications of a group of ground-truth classifications, wherein the data candidate is plotted in the confidence graph along the at least one feature-based coordinate axis and is color-coded or symbol-coded according to a ground-truth classification of the group of ground-truth classifications corresponding to the predicted classification, and wherein the confidence graph concurrently depicts a visual representation of:

the ground-truth classification corresponding to the predicted classification, and for respective data feature of the at least one data feature, a set of overlapping respective feature distribution representations of feature distributions for the respective ground-truth classifications of the group of ground-truth classifications.

10. The computer-implemented method of claim 9, wherein the confidence graph concurrently depicts the visual representation further of relative distances between the data candidate and respective subsets of training data candidates of the at least some portion of the annotated training dataset associated with each ground-truth classification of the group of ground-truth classifications.

11. The computer-implemented method of claim 10, wherein the relative distances between the data candidate and the respective subsets of training data candidates are depicted via a scatterplot, and wherein the feature distribution representations are color-coded or symbol-coded according to the respective ground-truth classifications.

12. The computer-implemented method of claim 11, wherein the confidence graph indicates, via the set of overlapping respective feature distribution representations of the feature distributions for the respective data feature and the respective ground-truth classifications, which of the feature distributions for the respective data feature has a mean that is nearest to the data candidate.

13. The computer-implemented method of claim 9, wherein the confidence graph comprises at least one of a one-dimensional histogram, a two-dimensional scatterplot, a three-dimensional scatterplot, a heat map, a density map, or a t-distributed stochastic neighbor embedding plot.

14. The computer-implemented method of claim 9, further comprising:

selecting, by the system, the at least some portion of the annotated training dataset based on user-provided input.

15. The computer-implemented method of claim 9, further comprising:

selecting, by the system, the at least some portion of the annotated training dataset based on the data candidate.

16. The computer-implemented method of claim 9, wherein the data candidate is a medical image that depicts an anatomical structure of a medical patient, wherein the predicted classification is a pathology diagnosis, and wherein the at least one data feature comprises at least one of a size metric or a shape metric associated with the anatomical structure.

17. A computer program product for facilitating dynamic user-interface comparison between machine learning output and training data, the computer program product comprising a computer-readable memory having program instructions embodied therewith, the program instructions executable by a processor to cause the processor to:

access a data candidate on which a machine learning classifier is to be executed;

generate, via execution of the machine learning classifier, a predicted classification based on the data candidate, wherein the machine learning classifier receives as input the data candidate, and wherein the machine learning classifier produces as output the predicted classification; and render, on an electronic display, a confidence graph that visually depicts how well or how poorly the data candidate and the predicted classification fit into an annotated training dataset on which the machine learning classifier has been trained, wherein the confidence graph comprises at least one feature-based coordinate axis that respectively corresponds to at least one data feature, wherein at least some portion of the annotated training dataset is plotted in the confidence graph along the at least one feature-based coordinate axis and is color-coded or symbol-coded according to respective ground-truth classifications of a group of ground-truth classifications, wherein the data candidate is plotted in the confidence graph along the at least one feature-based coordinate axis and is color-coded or symbol-coded according to a ground-truth classification of the group of ground-truth classifications corresponding to the predicted classification, and wherein the confidence graph concurrently depicts a visual representation of:

the ground-truth classification corresponding to the predicted classification, and for respective data feature of the at least one data feature, a set of overlapping respective feature distribution representations of feature distributions for the respective ground-truth classifications of the group of ground-truth classifications.

18. The computer program product of claim 17, wherein the confidence graph concurrently depicts the visual representation further of relative distances between the data candidate and respective subsets of training data candidates of the at least some portion of the annotated training dataset associated with each ground-truth classification of the group of ground-truth classifications.

19. The computer program product of claim 18, wherein the relative distances between the data candidate and the respective subsets of training data candidates are depicted via a scatterplot, and wherein the respective feature distribution representations are color-coded or symbol-coded according to the respective ground-truth classifications.

20. The computer program product of claim 17, wherein the confidence graph comprises at least one of a one-dimensional histogram, a two-dimensional scatterplot, a three-dimensional scatterplot, a heat map, a density map, or a t-distributed stochastic neighbor embedding plot.

\* \* \* \* \*